US012749285B2

(12) United States Patent
Feng et al.

(10) Patent No.: US 12,749,285 B2
(45) Date of Patent: Sep. 29, 2026

(54) MODIFYING SHADOWS IN IMAGE DATA

(71) Applicant: QUALCOMM Incorporated, San Diego, CA (US)

(72) Inventors: Wen-Chun Feng, New Taipei City (TW); Su-Chin Chiu, Wanhua Dist. (TW); Hsuan-Ying Liao, Hsinchu City (TW); Yu-Ren Lai, Xinyi Dist. (TW); An-Jen Liu, Xinyi Dist. (TW)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 18/606,912

(22) Filed: Mar. 15, 2024

(65) Prior Publication Data

US 2025/0292462 A1 Sep. 18, 2025

(51) Int. Cl.

| | |
|---|---|
| ***G06T 11/60*** | (2026.01) |
| ***G06T 5/77*** | (2024.01) |
| ***G06V 10/60*** | (2022.01) |
| ***G06V 10/764*** | (2022.01) |

(52) U.S. Cl.

CPC ................ *G06T 11/60* (2013.01); *G06T 5/77* (2024.01); *G06V 10/60* (2022.01); *G06V 10/764* (2022.01)

(58) Field of Classification Search

None

See application file for complete search history.

(56) References Cited

U.S. PATENT DOCUMENTS

| | | | | |
|---|---|---|---|---|
| 6,320,581 | B1 * | 11/2001 | Browne | G06T 15/80 345/589 |
| 7,366,323 | B1 * | 4/2008 | Yao | G06V 10/267 348/94 |
| 8,619,151 | B2 * | 12/2013 | Park | H04N 5/262 348/222.1 |
| 9,142,011 | B2 * | 9/2015 | Fan | G06T 7/11 |
| 9,430,715 | B1 * | 8/2016 | Wang | G06T 5/94 |
| 9,846,924 | B2 * | 12/2017 | Pacheco | G06T 5/50 |
| 10,380,803 | B1 * | 8/2019 | Jaafar | G06T 19/006 |
| 10,643,336 | B2 * | 5/2020 | Usikov | G06T 7/136 |
| 12,198,311 | B2 * | 1/2025 | Chopra | G06N 3/0464 |
| 12,288,279 | B2 * | 4/2025 | Brandt | G06T 11/60 |
| 2003/0179915 | A1 * | 9/2003 | Goto | G06T 7/12 382/128 |
| 2007/0110309 | A1 * | 5/2007 | Ibrahim | G06T 7/73 382/171 |
| 2010/0119153 | A1 * | 5/2010 | Rai | H04N 1/4072 382/282 |
| 2012/0229650 | A1 * | 9/2012 | Matthews | G06T 5/50 348/E5.085 |

(Continued)

*Primary Examiner* — David H Chu

(74) *Attorney, Agent, or Firm* — QUALCOMM Incorporated

(57) ABSTRACT

Systems and techniques are described herein for modifying images. For instance, a method for modifying images is provided. The method may include receiving an image, the image including a first plurality of pixels representing a first shadow of a first shadow type and a second plurality of pixels representing a second shadow of a second shadow type; processing the image to detect the first shadow; and modifying the first plurality of pixels of the image to generate an output image, wherein the output image includes the second plurality of pixels representing the second shadow.

18 Claims, 18 Drawing Sheets

(56) References Cited

U.S. PATENT DOCUMENTS

| | | | | |
|---|---|---|---|---|
| 2012/0250961 | A1* | 10/2012 | Iwasaki | G16H 15/00 382/128 |
| 2014/0240477 | A1* | 8/2014 | Feng | H04N 23/81 348/77 |
| 2022/0188991 | A1* | 6/2022 | Chopra | G06T 5/80 |
| 2023/0260091 | A1* | 8/2023 | Mondal | H04N 1/4074 382/100 |
| 2023/0368071 | A1* | 11/2023 | Yucel | G06N 3/0464 |
| 2024/0144623 | A1* | 5/2024 | Gori | G06T 7/70 |
| 2024/0362758 | A1* | 10/2024 | Bagnall | G06V 20/70 |
| 2024/0362815 | A1* | 10/2024 | Joachim | G06T 11/00 |

* cited by examiner

MODIFYING SHADOWS IN IMAGE DATA

TECHNICAL FIELD

The present disclosure generally relates to image modification. For example, aspects of the present disclosure include systems and techniques for modifying shadows in images.

BACKGROUND

An image is a representation of a scene as captured by a camera. For example, an image may be a representation of light reflected from points in the scene and focused onto an image sensor of a camera. Some scenes may include shadows. For example, there may be an object between a light source and the scene. Portions of the scene may be illuminated directly by the light source. In contrast, other portions of the scene may be less illuminated based on the object blocking light from the light source. The other portions may be in a shadow of the object. An image of the scene may include representations of the shadows. For example, portions of the image representing portions of the scene that are directly illuminated by the light source may be brighter than the portions of the image representing portions of the scene that are in the shadow of the object.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for modifying images. According to at least one example, a method is provided for modifying images. The method includes: receiving an image, the image including a first plurality of pixels representing a first shadow of a first shadow type and a second plurality of pixels representing a second shadow of a second shadow type; processing the image to detect the first shadow; and modifying the first plurality of pixels of the image to generate an output image, wherein the output image includes the second plurality of pixels representing the second shadow.

In another example, an apparatus for modifying images is provided that includes at least one memory and at least one processor (e.g., configured in circuitry) coupled to the at least one memory. The at least one processor configured to: receive an image, the image including a first plurality of pixels representing a first shadow of a first shadow type and a second plurality of pixels representing a second shadow of a second shadow type; process the image to detect the first shadow; and modify the first plurality of pixels of the image to generate an output image, wherein the output image includes the second plurality of pixels representing the second shadow.

In another example, a non-transitory computer-readable medium is provided that has stored thereon instructions that, when executed by one or more processors, cause the one or more processors to: receive an image, the image including a first plurality of pixels representing a first shadow of a first shadow type and a second plurality of pixels representing a second shadow of a second shadow type; process the image to detect the first shadow; and modify the first plurality of pixels of the image to generate an output image, wherein the output image includes the second plurality of pixels representing the second shadow.

In another example, an apparatus for modifying images is provided. The apparatus includes: means for receiving an image, the image including a first plurality of pixels representing a first shadow of a first shadow type and a second plurality of pixels representing a second shadow of a second shadow type; means for processing the image to detect the first shadow; and means for modifying the first plurality of pixels of the image to generate an output image, wherein the output image includes the second plurality of pixels representing the second shadow.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
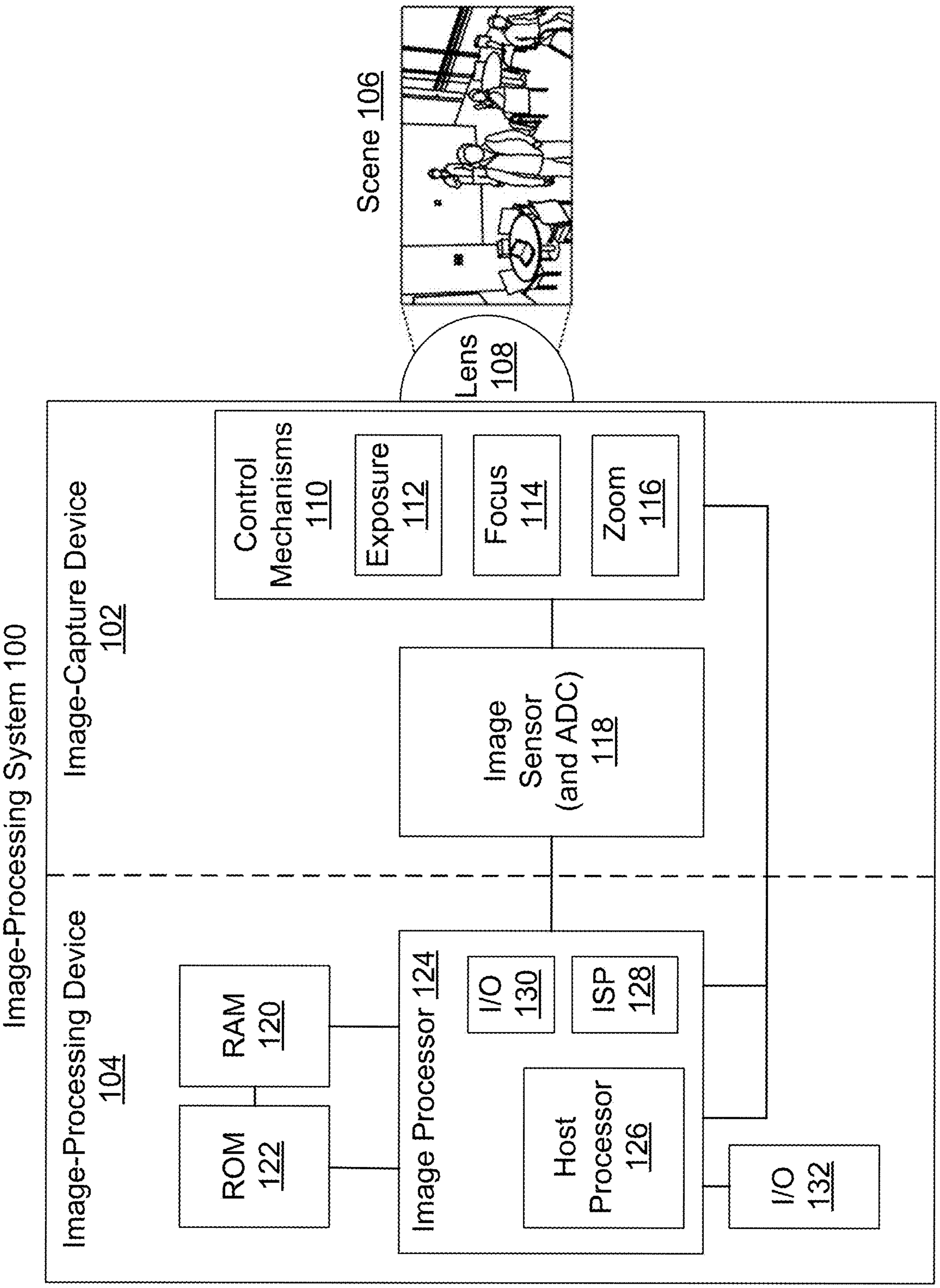
FIG. 1 is a block diagram illustrating an example architecture of an image processing system, according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Electronic devices (e.g., mobile phones, wearable devices (e.g., smart watches, smart glasses, etc.), tablet computers, extended reality (XR) devices (e.g., virtual reality (VR) devices, augmented reality (AR) devices, mixed reality (MR) devices, and the like), connected devices, laptop computers, etc.) are increasingly equipped with cameras to capture image frames, such as still images and/or video frames, for consumption. For example, an electronic device can include a camera to allow the electronic device to capture a video or image of a scene, a person, an object, etc. Additionally, cameras themselves are used in a number of configurations (e.g., handheld digital cameras, digital single-lens-reflex (DSLR) cameras, worn camera (including body-mounted cameras and head-borne cameras), stationary cameras (e.g., for security and/or monitoring), vehicle-mounted cameras, etc.).

A camera can receive light and capture image frames (e.g., still images or video frames) using an image sensor (which may include an array of photosensors). In some examples, a camera may include one or more processors, such as image signal processors (ISPs), that can process one or more image frames captured by an image sensor. For example, a raw image frame captured by an image sensor can be processed by an image signal processor (ISP) of a camera to generate a final image. In some cases, a camera, or an electronic device implementing a camera, can further process a captured image or video for certain effects (e.g., compression, image enhancement, image restoration, scaling, framerate conversion, etc.) and/or certain applications such as computer vision, extended reality (e.g., augmented reality, virtual reality, and the like), object detection, image recognition (e.g., face recognition, object recognition, scene recognition, etc.), feature extraction, authentication, and automation, among others.

As described above, in some cases, portions of a scene may be directly illuminated by a light source while other portions of the scene may be in a shadow of an object that is between the light source and the scene. Images of the scene may include bright portions representing the portions of the scene that are directly illuminated and dark portions representing the other portions of the scene that are in the shadow of the object.

It may be desirable to remove some shadows from images. For example, it may be desirable to artificially brighten portions of images in post-capture processing. In the present disclosure, references to "removing shadows" of images may refer to altering the images (e.g., in post-capture image processing) in such a way that the shadows appear to not be present in the images (for example, by brightening pixels of the images). In the present disclosure, references to "modifying shadows" of images may refer to altering the images (e.g., in post-capture image processing) in such a way that the shadows appear different in the final image than in the captured image (for example, by brightening pixels of the images).

For instance, it may be desirable to remove shadows from faces of people in an image of the people. As another example, it may be desirable to remove shadows from road signs in images of an environment including road signs (e.g., as captured by a vehicle).

Some image-modification techniques remove shadows from images. For example, some machine-learning models have been trained to artificially brighten portions of images to remove shadows from images.

It may be desirable to retain some shadows in images. For example, it may be aesthetically pleasing to retain some shadows in an image of a scene. For instance, shadows may give an image a sense of realism, an atmosphere, a tone, and/or a mood.

Systems, apparatuses, methods (also referred to as processes), and computer-readable media (collectively referred to herein as "systems and techniques") are described herein for modifying shadows in images. According to some aspects, the systems and techniques described herein may selectively remove shadows from images. For example, the systems and techniques may remove some shadows from an image while not removing other shadows in the image.

For example, the systems and techniques may determine whether an image is a candidate for shadow removal. An image that is a candidate for shadow removal, may be benefitted by the removal of at least some shadows of the image. An image may be a candidate for shadow removal based on the image being likely to include unwanted shadows (e.g., photographer shadows). In the present disclosure, the term "photographer shadow" may be used to describe shadows of a handheld device used to capture an image (e.g., a camera or device including a camera), shadows of hands (e.g., holding the handheld device), and/or shadows of a head, neck, shoulder, and/or body of person (e.g., the person holding the handheld device).

For example, photographer shadows may be common in images of food because a photographer may hold their camera close to and above the food to fill the image frame with the food. In so doing, the photographer may place the camera between a light source and the food, casting a photographer shadow on the food.

As another example, photographer shadows may be common in images of documents and/or books. For example, a photographer may hold their camera directly above a printed page of text (and/or images) so that the image frame corresponds to borders of the printed page. In so doing, the photographer may place the camera between a light source and the printed page casting a photographer shadow on the printed page. In the present disclosure, the term "document" may refer to text and/or images on a relatively flat (and/or deformable) surface. For example, documents may include: papers with text and/or images printed thereon, papers with hand-written text thereon, papers with hand-drawn images thereon, images on paper or canvas, printed photographs, pages of books, newspapers, magazines, etc.

The systems and techniques may determine whether an image is a candidate for shadow removal based on image-capture conditions related to the image. The image-capture conditions may indicate that the image is likely to include photographer shadows. For example, the systems and techniques may determine whether a camera which captured the image is angled down at a close subject. If the systems and techniques determine that the image was captured by a camera pointing down at a close subject, the systems and techniques may modify the image to selectively remove shadows (e.g., photographer shadows) from the image.

In some aspects, the systems and techniques may further modify the image to simulate a change in a source of light lighting the scene. For example, in modifying the image to remove shadows, the systems and techniques may have analyzed lighting and/or shadows in the image (for example, the systems and techniques may have generated a shadow mask indicative of photographer shadows in the image). The systems and techniques may use information based on the analysis of lighting and/or shadows in the image, along with additional information based on the lighting and/or shadows in the image to modify the image. The modifications to the image may change the lighting of the image in such a way that the image appears to have been captured with different lighting. For example, the image may appear as if a source of light was in a different position relative to the scene, had a different intensity, and/or had a different hue.

The systems and techniques may remove photographer shadows and not natural shadows from images identified as candidate images. In some aspects, the systems and techniques may remove the shadows using machine-learning-based techniques, which may avoid generating artifacts that may occur if shadow removal is directly applied to images.

In removing photographer shadows, the systems and techniques may analyze the relation between shadows and subjects of images. In doing so, the systems and techniques may determine information regarding a light source which illuminates the scene of the images. For example, the systems and techniques may determine a position of a light source relative to subjects of the images.

In some aspects, the systems and techniques may use the determined lighting information to modify an image to simulate a modification to a lighting condition of the scene, for example, to modify an atmosphere or mood of the image.

By removing unwanted shadows, the systems and techniques may increase recognition and/or classification rates of object detectors, recognizers and/or classifiers. For example, images modified by the systems and techniques (e.g., images with shadows removed), may, when processed by object detectors, recognizers and/or classifiers, allow the object detectors, recognizers and/or classifiers to produce more accurate results.

Various aspects of the application will be described with respect to the figures below.

FIG. 1 is a block diagram illustrating an example architecture of an image-processing system 100, according to various aspects of the present disclosure. The image-processing system 100 includes various components that are used to capture and process images, such as an image of a scene 106. The image-processing system 100 can capture image frames (e.g., still images or video frames). In some cases, the lens 108 and image sensor 118 (which may include an analog-to-digital converter (ADC)) can be associated with an optical axis. In one illustrative example, the photosensitive area of the image sensor 118 (e.g., the photodiodes) and the lens 108 can both be centered on the optical axis.

In some examples, the lens 108 of the image-processing system 100 faces a scene 106 and receives light from the scene 106. The lens 108 bends incoming light from the scene toward the image sensor 118. The light received by the lens 108 then passes through an aperture of the image-processing system 100. In some cases, the aperture (e.g., the aperture size) is controlled by one or more control mechanisms 110. In other cases, the aperture can have a fixed size.

The one or more control mechanisms 110 can control exposure, focus, and/or zoom based on information from the image sensor 118 and/or information from the image processor 124. In some cases, the one or more control mechanisms 110 can include multiple mechanisms and components. For example, the control mechanisms 110 can include one or more exposure-control mechanisms 112, one or more focus-control mechanisms 114, and/or one or more zoom-control mechanisms 116. The one or more control mechanisms 110 may also include additional control mechanisms besides those illustrated in FIG. 1. For example, in some cases, the one or more control mechanisms 110 can include control mechanisms for controlling analog gain, flash, HDR, depth of field, and/or other image capture properties.

The focus-control mechanism 114 of the control mechanisms 110 can obtain a focus setting. In some examples, focus-control mechanism 114 stores the focus setting in a memory register. Based on the focus setting, the focus-control mechanism 114 can adjust the position of the lens 108 relative to the position of the image sensor 118. For example, based on the focus setting, the focus-control mechanism 114 can move the lens 108 closer to the image sensor 118 or farther from the image sensor 118 by actuating a motor or servo (or other lens mechanism), thereby adjusting the focus. In some cases, additional lenses may be included in the image-processing system 100. For example, the image-processing system 100 can include one or more microlenses over each photodiode of the image sensor 118. The microlenses can each bend the light received from the lens 108 toward the corresponding photodiode before the light reaches the photodiode.

In some examples, the focus setting may be determined via contrast detection autofocus (CDAF), phase detection autofocus (PDAF), hybrid autofocus (HAF), or some combination thereof. The focus setting may be determined using the control mechanism 110, the image sensor 118, and/or the image processor 124. The focus setting may be referred to as an image capture setting and/or an image processing setting. In some cases, the lens 108 can be fixed relative to the image sensor and the focus-control mechanism 114.

The exposure-control mechanism 112 of the control mechanisms 110 can obtain an exposure setting. In some cases, the exposure-control mechanism 112 stores the exposure setting in a memory register. Based on the exposure setting, the exposure-control mechanism 112 can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 118 (e.g., ISO speed or film speed), analog gain applied by the image sensor 118, or any combination thereof. The exposure setting may be referred to as an image capture setting and/or an image processing setting.

The zoom-control mechanism 116 of the control mechanisms 110 can obtain a zoom setting. In some examples, the zoom-control mechanism 116 stores the zoom setting in a memory register. Based on the zoom setting, the zoom-control mechanism 116 can control a focal length of an assembly of lens elements (lens assembly) that includes the lens 108 and one or more additional lenses. For example, the zoom-control mechanism 116 can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 108 in some cases) that receives the light from the scene 106 first, with the light then passing through a focal zoom system between the focusing lens (e.g., lens 108) and the image sensor 118 before the light reaches the image sensor 118. The focal zoom system may, in some cases, include two positive (e.g., converging, convex) lenses of equal or similar focal length (e.g., within a threshold difference of one another) with a negative (e.g., diverging, concave) lens between them. In some cases, the zoom-control mechanism 116 moves one or more of the lenses in the focal zoom system, such as the negative lens and one or both of the positive lenses. In some cases, zoom-control mechanism 116 can control the zoom by capturing an image from an image sensor of a plurality of image sensors (e.g., including image sensor 118) with a zoom corresponding to the zoom setting. For example, the image-processing system 100 can include a wide-angle image sensor with a relatively low zoom and a telephoto image sensor with a greater zoom. In some cases, based on the selected zoom setting, the zoom-control mechanism 116 can capture images from a corresponding sensor.

The image sensor 118 includes one or more arrays of photodiodes or other photosensitive elements. Each photodiode measures an amount of light that eventually corresponds to a particular pixel in the image produced by the image sensor 118. In some cases, different photodiodes may be covered by different filters. In some cases, different photodiodes can be covered in color filters, and may thus measure light matching the color of the filter covering the photodiode. Various color filter arrays can be used such as, for example and without limitation, a Bayer color filter array, a quad color filter array (QCFA), and/or any other color filter array.

In some cases, the image sensor 118 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an "infrared (IR)" cut filter, an "ultraviolet (UV)" cut filter, a band-pass filter, low-pass filter, high-pass filter, or the like). The image sensor 118 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 110 may be included instead or additionally in the image sensor 118. The image sensor 118 may be a charge-coupled device (CCD) sensor, an electron-multiplying CCD (EMCCD) sensor, an active-pixel sensor (APS), a "complimentary metal-oxide semiconductor (CMOS)", an N-type metal-oxide semiconductor (NMOS), a hybrid CCD/CMOS sensor (e.g., sCMOS), or some other combination thereof.

Figure 16:
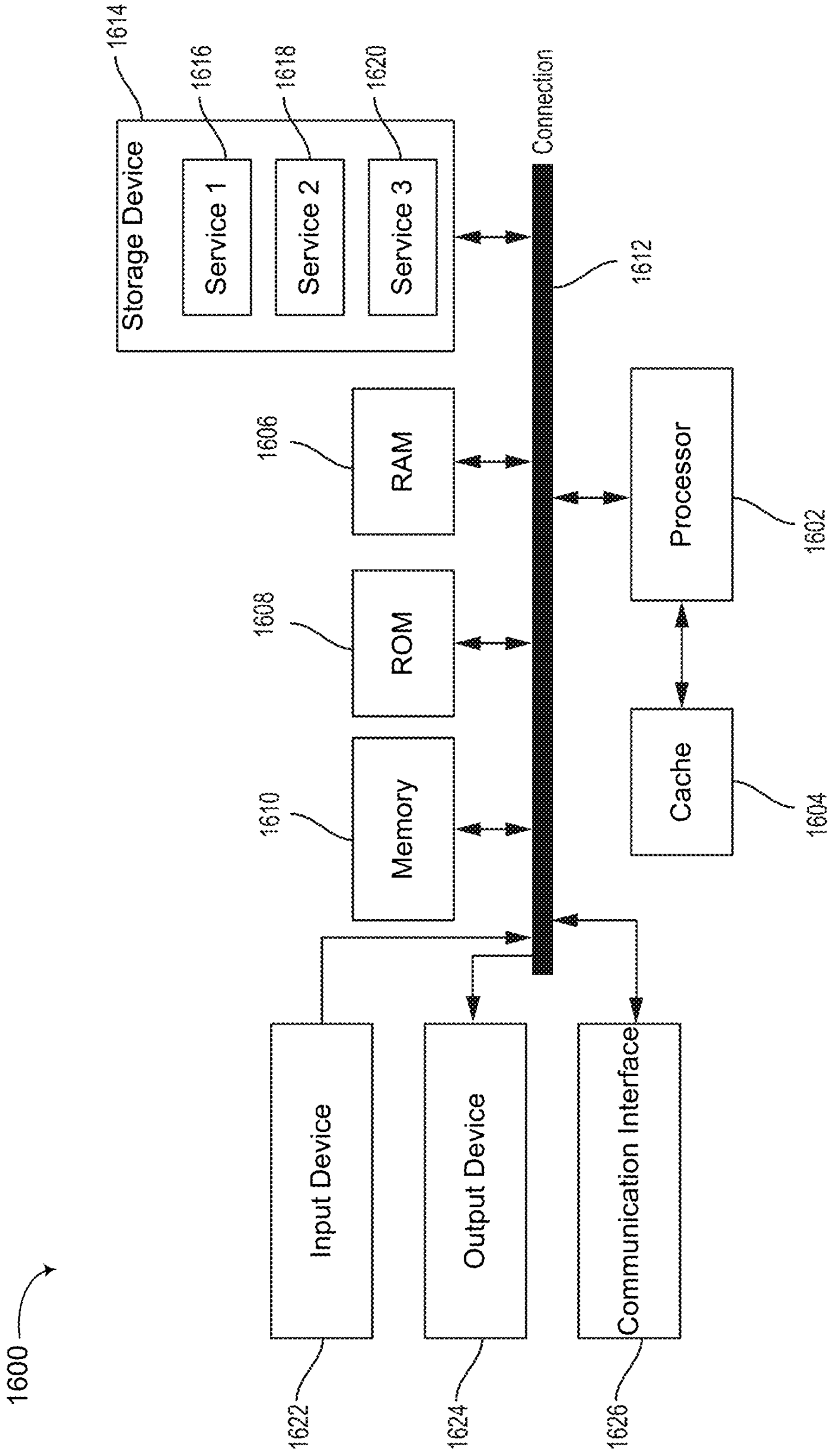
FIG. 16 is a block diagram illustrating an example computing-device architecture of an example computing device which can implement the various techniques described herein.

The image processor 124 may include one or more processors, such as one or more image signal processors (ISPs) (including ISP 128), one or more host processors (including host processor 126), and/or one or more of any other type of processor discussed with respect to the computing-device architecture 1600 of FIG. 16. The host processor 126 can be a digital signal processor (DSP) and/or other type of processor. In some implementations, the image processor 124 is a single integrated circuit or chip (e.g., referred to as a system-on-chip or SoC) that includes the host processor 126 and the ISP 128. In some cases, the chip can also include one or more input/output ports (e.g., input/output (I/O) ports 130), central processing units (CPUs), graphics processing units (GPUs), broadband modems (e.g., third generation (3G), fourth generation (4G) or long-term evolution (LTE), 5G, etc.), memory, connectivity components (e.g., Bluetooth™, Global Positioning System (GPS), etc.), any combination thereof, and/or other components. The I/O ports 130 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General-Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 126 can communicate with the image sensor 118 using an I2C port, and the ISP 128 can communicate with the image sensor 118 using an MIPI port.

The image processor 124 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 124 may store image frames and/or processed images in "random-access memory (RAM)" 120, read-only memory (ROM) 122, a cache, a memory unit, another storage device, or some combination thereof.

Various input/output (I/O) devices 132 may be connected to the image processor 124. The I/O devices 132 can include a display screen, a keyboard, a keypad, a touchscreen, a trackpad, a touch-sensitive surface, a printer, any other output devices, any other input devices, or any combination thereof. In some cases, a caption may be input into the image-processing device 104 through a physical keyboard or keypad of the I/O devices 132, or through a virtual keyboard or keypad of a touchscreen of the I/O devices 132. The I/O devices 132 may include one or more ports, jacks, or other connectors that enable a wired connection between the image-processing system 100 and one or more peripheral devices, over which the image-processing system 100 may receive data from the one or more peripheral device and/or transmit data to the one or more peripheral devices. The I/O devices 132 may include one or more wireless transceivers that enable a wireless connection between the image-processing system 100 and one or more peripheral devices, over which the image-processing system 100 may receive data from the one or more peripheral device and/or transmit data to the one or more peripheral devices. The peripheral devices may include any of the previously-discussed types of the I/O devices 132 and may themselves be considered I/O devices 132 once they are coupled to the ports, jacks, wireless transceivers, or other wired and/or wireless connectors.

In some cases, the image-processing system 100 may be a single device. In some cases, the image-processing system 100 may be two or more separate devices, including an image-capture device 102 (e.g., a camera) and an image-processing device 104 (e.g., a computing device coupled to the camera). In some implementations, the image-capture device 102 and the image-capture device 102 may be coupled together, for example via one or more wires, cables, or other electrical connectors, and/or wirelessly via one or more wireless transceivers. In some implementations, the image-capture device 102 and the image-processing device 104 may be disconnected from one another.

As shown in FIG. 1, a vertical dashed line divides the image-processing system 100 of FIG. 1 into two portions that represent the image-capture device 102 and the image-processing device 104, respectively. The image-capture device 102 includes the lens 108, control mechanisms 110, and the image sensor 118. The image-processing device 104 includes the image processor 124 (including the ISP 128 and the host processor 126), the RAM 120, the ROM 122, and the I/O device 132. In some cases, certain components illustrated in the image-capture device 102, such as the ISP 128 and/or the host processor 126, may be included in the image-capture device 102. In some examples, the image-processing system 100 can include one or more wireless transceivers for wireless communications, such as cellular network communications, 802.11 wi-fi communications, wireless local area network (WLAN) communications, or some combination thereof.

The image-processing system 100 can be part of, or implemented by, a single computing device or multiple computing devices. In some examples, the image-processing system 100 can be part of an electronic device (or devices) such as a camera system (e.g., a digital camera, an Internet Protocol (IP) camera, a video camera, a security camera, etc.), a telephone system (e.g., a smartphone, a cellular telephone, a conferencing system, etc.), a laptop or notebook computer, a tablet computer, a set-top box, a smart television, a display device, a game console, an XR device (e.g., an head-mounted device (HMD), smart glasses, etc.), an IoT (Internet-of-Things) device, a smart wearable device, a video streaming device, an Internet Protocol (IP) camera, or any other suitable electronic device(s).

While the image-processing system 100 is shown to include certain components, one of ordinary skill will appreciate that the image-processing system 100 can include more components than those shown in FIG. 1. The components of the image-processing system 100 can include software, hardware, or one or more combinations of software and hardware. For example, in some implementations, the components of the image-processing system 100 can include and/or can be implemented using electronic circuits or other electronic hardware, which can include one or more programmable electronic circuits (e.g., microprocessors, GPUs, digital signal processors (DSPs) CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image-processing system 100.

In some examples, the computing-device architecture 1600 shown in FIG. 16 and further described below can include the image-processing system 100, the image-capture device 102, the image-processing device 104, or a combination thereof.

In some examples, the image-processing system 100 can create an HDR image using multiple image frames with different exposures. For example, the image-processing system 100 can create an HDR image using a short exposure (SE) image, a medium exposure (ME) image, and a long exposure (LE) image. As another example, the image-processing system 100 can create an HDR image using an SE image and an LE image. In some cases, the image-processing system 100 can write the different image frames from one or more camera frontend engines to a memory device, such as a DDR memory device or any other memory device. A post-processing engine can then retrieve the image frames and fuse (e.g., merge, combine) them into a single image. As previously explained, the different write and read operations used to create the HDR image can result in significant power and bandwidth consumption.

Figure 2:
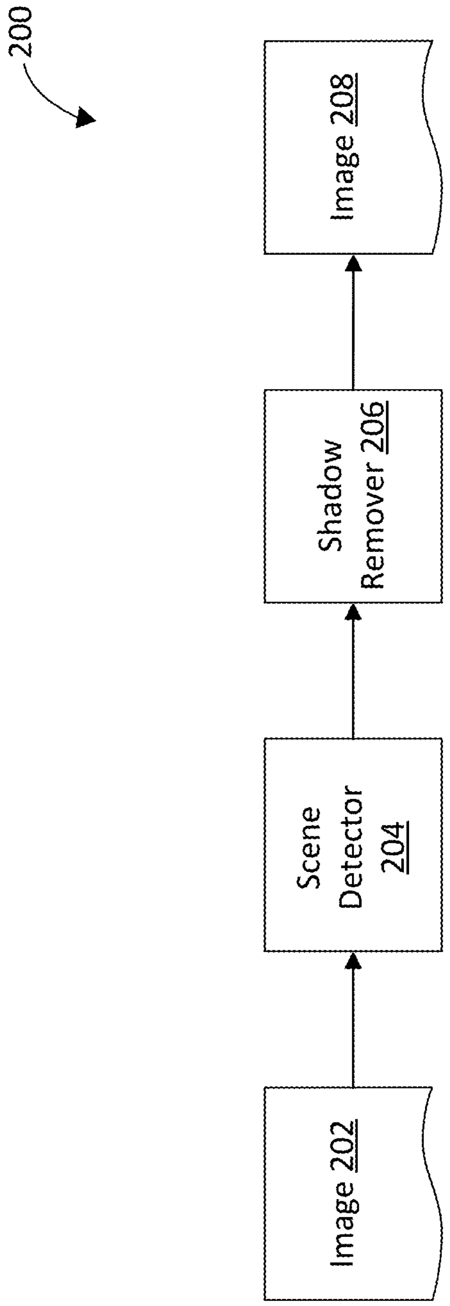
FIG. 2 is a block diagram illustrating a system that may modify an image, according to various aspects of the present disclosure.

FIG. 2 is a block diagram illustrating a system 200 that may modify an image 202 to generate image 208, according to various aspects of the present disclosure. For example, system 200 may selectively remove shadows from image 202 to generate image 208. System 200 may be implemented in image-processing system 100 of FIG. 1, for example, in image processor 124 of image-processing device 104 of FIG. 1.

Figure 3:
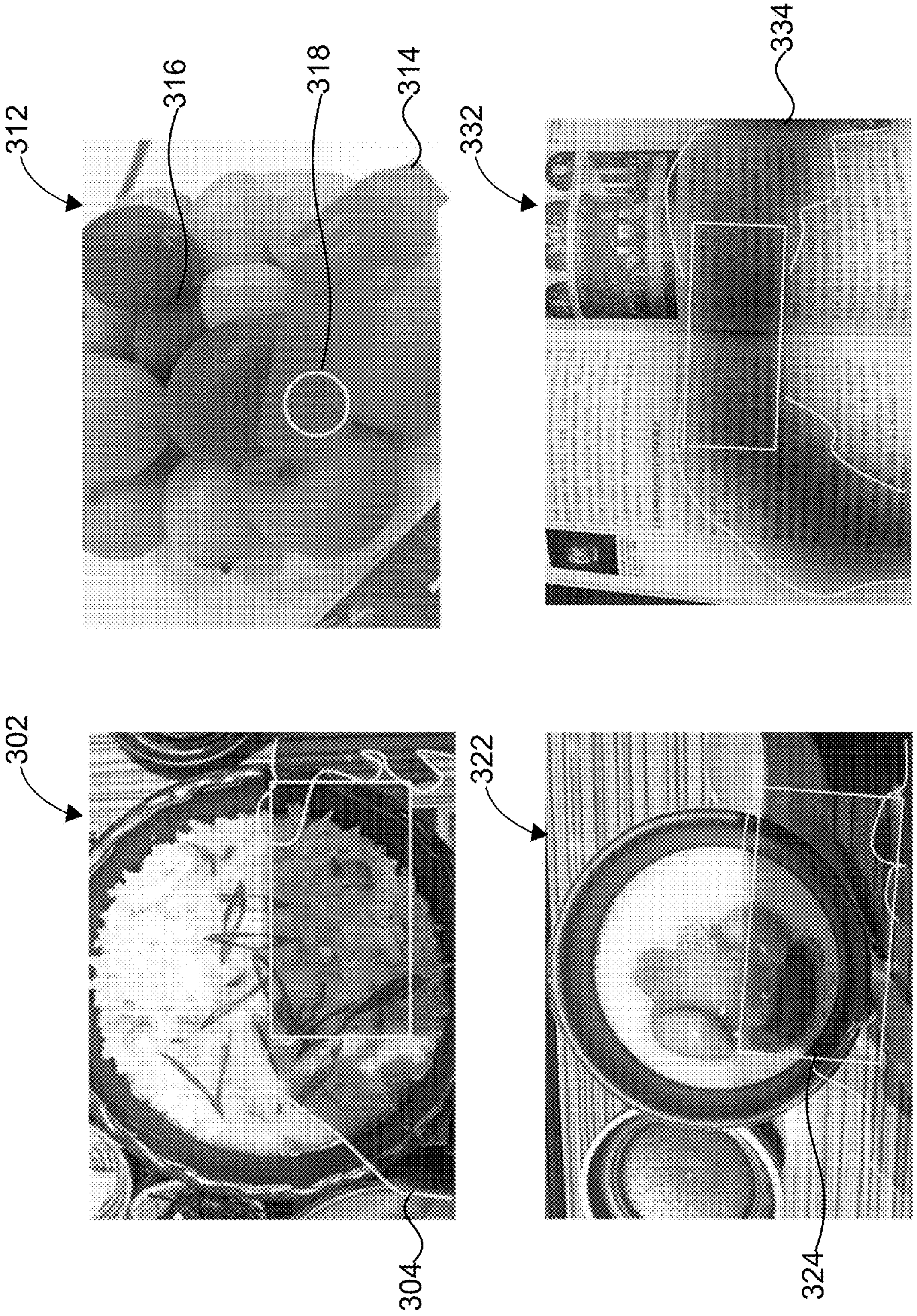
FIG. 3 includes four example images, each including a respective photographer shadow.

Image 202 may be an image of a scene as captured by a camera. Image 202 may include representations of shadows in the scene. For example, FIG. 3 includes four example images including, an image 302 including a shadow 304 (which may be a photographer shadow). FIG. 3 also includes an image 312 including a shadow 314 (which may be a photographer shadow) and a shadow 316 (which may be a natural shadow, e.g., not a photographer shadow). Image 312 also includes a shadow 318 including an overlap of a natural shadow and a photographer shadow. FIG. 3 also includes image 332 including shadow 324 (which may be a photographer shadow) and image 332 including shadow 334 (which may be a photographer shadow). Image 302 and image 322 are provided as examples of images of food and image 332 is provided as an example of an image of a document.

Returning to FIG. 2, a scene detector 204 of system 200 may determine whether image 202 exhibits is a candidate for shadow removal. For example, the image-capture conditions related to image 202 may indicate that image 202 is likely to include a photographer shadow. Additionally or alternatively, scene detector 204 may determine whether image 202 is an image of food or an image of a document and scene detector 204 may determine that image 202 is a candidate for shadow removal based on image 202 representing food or a document. The image-capture conditions may include, for example, a focus distance of image 202, a tilt angle of a device that captured image 202, a subject of image 202 being stationary, a classification of image 202 by an image classifier, other image information, and/or other image-capture information and/or any combination thereof.

Figure 4:
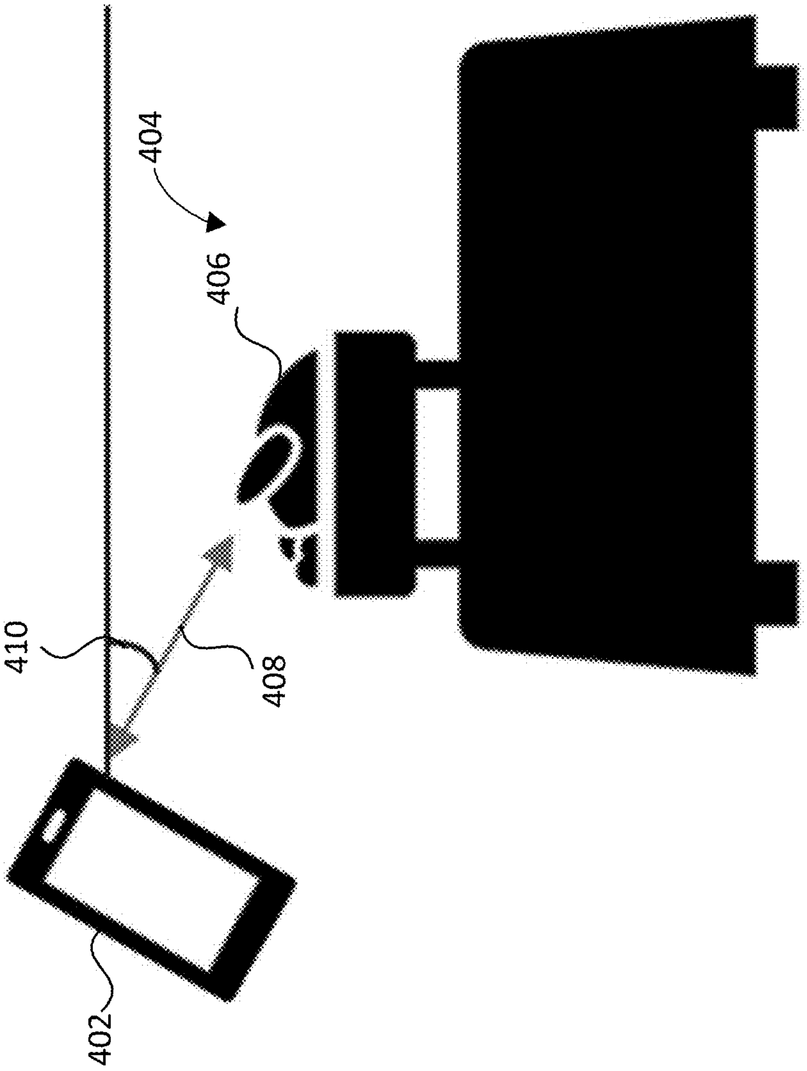
FIG. 4 is a diagram illustrating a device capturing an image of a scene to illustrate various concepts related to the present disclosure.

For example, scene detector 204 may receive image-capture information relative to image 202 (e.g., information relating to the capture of image 202). For instance, scene detector 204 may receive focus information, such as a focus distance that was used (e.g., by focus-control mechanism 114 of FIG. 1) when image 202 was captured. For example, FIG. 4 is a diagram illustrating a device 402 capturing an image of a scene 404. In FIG. 4, distance 408 illustrates a focus distance between device 402 and a subject 406 of scene 404. Device 402 may include a focus-control mechanism 114 that may focus the captured image on subject 406. Scene detector 204 may receive a focus distance from focus-control mechanism 114.

Additionally or alternatively, scene detector 204 may receive orientation information (e.g., describing an orientation of the camera that captured image 202 when image 202 was captured). The orientation information may include a tilt angle of the camera (e.g., indicative of an elevation angle, or pitch angle, of the camera). The tilt angle may indicate whether the camera was being pointed or angled downward toward a subject of image 202. For example, tilt angle 410 illustrates a tilt angle of device 402. The tilt angle may be relative to horizontal. The camera which captured image 202 may include a gyroscope, inertial measurement unit (IMU), and/or other orientation sensor and may provide the orientation information to scene detector 204.

Scene detector 204 may, additionally or alternatively, receive an indication regarding whether a subject of image 202 is stationary. For example, image 202 may be one of several images of a subject. The several images may include preview images and/or burst-captured images of the subject. Based on an optical-flow analysis of the several images, a determination may be made regarding whether the subject is stationary. Scene detector 204 may receive an indication regarding whether the subject is stationary.

Additionally or alternatively, scene detector 204 may receive a classification of image 202. For example, image 202 may be provided to a classifier. The classifier may be a machine-learning model trained to classify images. The classifier may be trained to classify images into categories based on subjects, such as portraits, landscapes, images of food, images of documents, selfies, etc. Additionally or alternatively, the classifier may be trained to classify images based into a first class that includes images that are candidates for shadow removal or a second class that includes images that are not candidates for shadow removal.

In some aspects, scene detector 204 may determine whether to selectively remove shadows from image 202 based on predetermined criteria. For example, scene detector 204 may include criteria regarding focus distances (e.g., between 10 and 40 centimeters (cm)), criteria regarding tilt angles (e.g., between 30 and 120 degrees below horizontal), and/or movement criteria (e.g., stationary subjects). If image 202 satisfies the criteria, scene detector 204 may determine that image 202 is a candidate for shadow removal.

Additionally or alternatively, scene detector 204 may be, or may include, a machine-learning model trained to determine whether images are candidates for shadow removal based on image-capture information. Additionally or alternatively, scene detector 204 may be, or may include, a machine-learning model (e.g., an artificial neural network) trained to identify photographer shadows in images and to determine that the images are candidates for shadow removal based on detecting photographer shadows in the images.

If scene detector 204 determines that image 202 is a candidate for shadow removal (e.g., that image 202 would benefit from selective shadow removal), a shadow remover 206 may selectively remove shadows from image 202 to generate image 208. Image 208 may be a version of image 202 with at least some pixels (e.g., pixels representing photographer shadows) altered (e.g., brightened) such that shadows in a scene represented by image 202 are not present in image 208.

Figure 5:
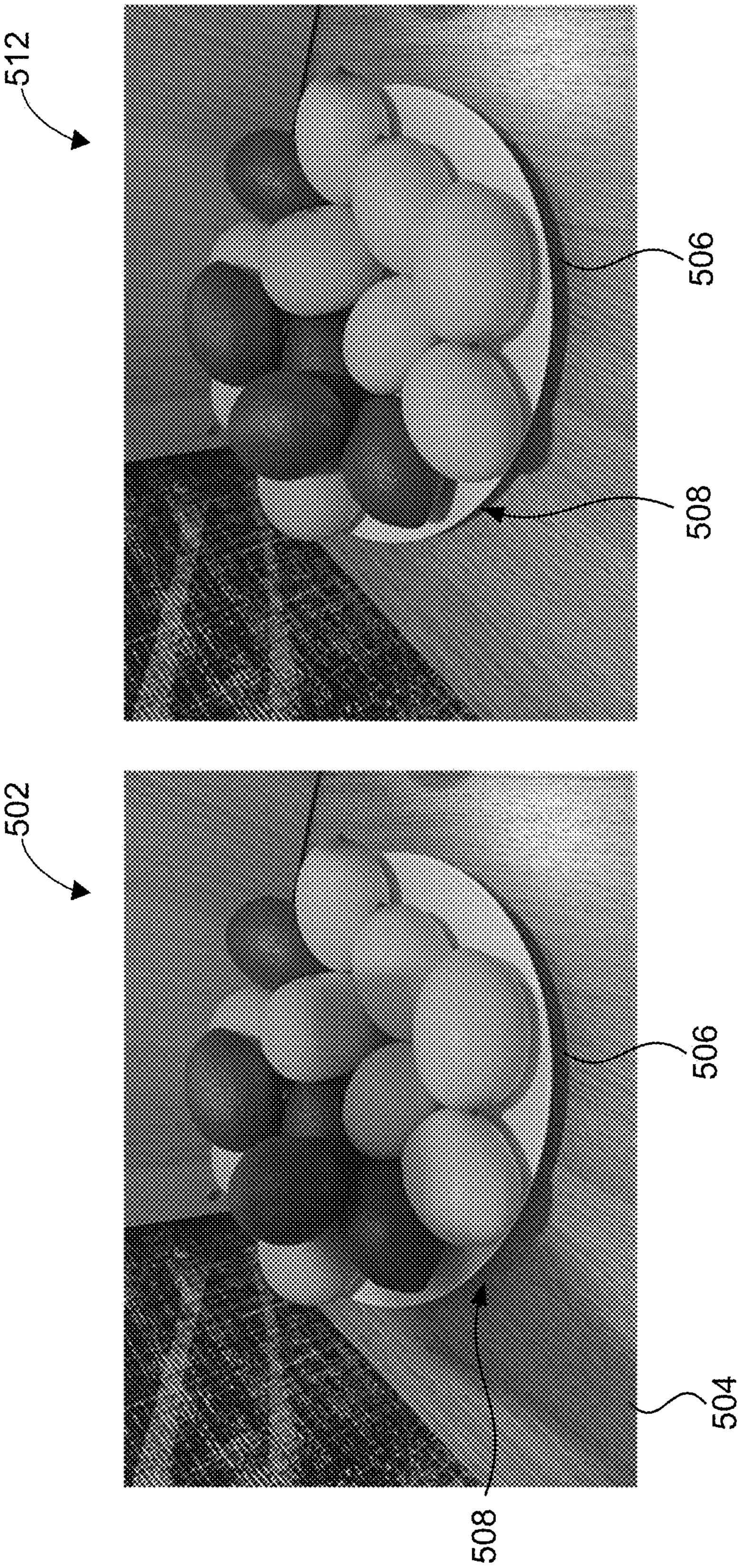
FIG. 5 includes a first image with a photographer shadow and a second image without the photographer shadow, the photographer shadow removed according to various aspects of the present disclosure.

For example, FIG. 5 includes a first image 502 that may be an example of image 202 and a second image 512 that may be an example of image 208. Image 502 includes shadow 504 (which may be a photographer shadow), for example, image 502 includes pixels representing shadow 504. Image 502 also includes shadow 506 (which is a natural shadow), for example, image 502 includes pixels representing shadow 506. Image 502 includes a region 508 including pixels representing both shadow 504 and shadow 506.

Image 512 includes shadow 506, but not shadow 504. For example, shadow 504 may have been removed, according to various aspects of the present disclosure. In image 512, shadow 506 is present in region 508.

Returning to FIG. 2, in some aspects, shadow remover 206 may fuse multiple inputs with different digital-gain for boosting up shadow area. For example, shadow remover 206 may boost a gain of pixels in a region of image 202 that is affected by a photographer shadow.

Shadow remover 206 may include a shadow detector and/or a shadow remover. In other words, operations performed by shadow remover 206 may be divided, for descriptive purposes, into tasks associated with detecting (and/or identifying positions of) shadows and tasks associated with removing the shadows from images.

In some aspects, shadow remover 206 may include a machine-learning model trained to identify photographer-shadow regions and a shadow booster that may boost gain of pixels of the photographer-shadow regions.

In some aspects, shadow remover 206 may include a shadow remover (e.g., a machine-learning model trained to remove shadows) and not a shadow detector. For example, the machine-learning model may be trained to remove shadows without having a separate shadow detector detect the shadows first.

In some aspects, shadow remover 206 may include a machine-learning model trained to detect shadows and a machine-learning model trained to remove shadows. In such aspects, the machine-learning model trained to remove shadows may use information generated by the machine-learning model trained to detect shadows.

Figure 6A:
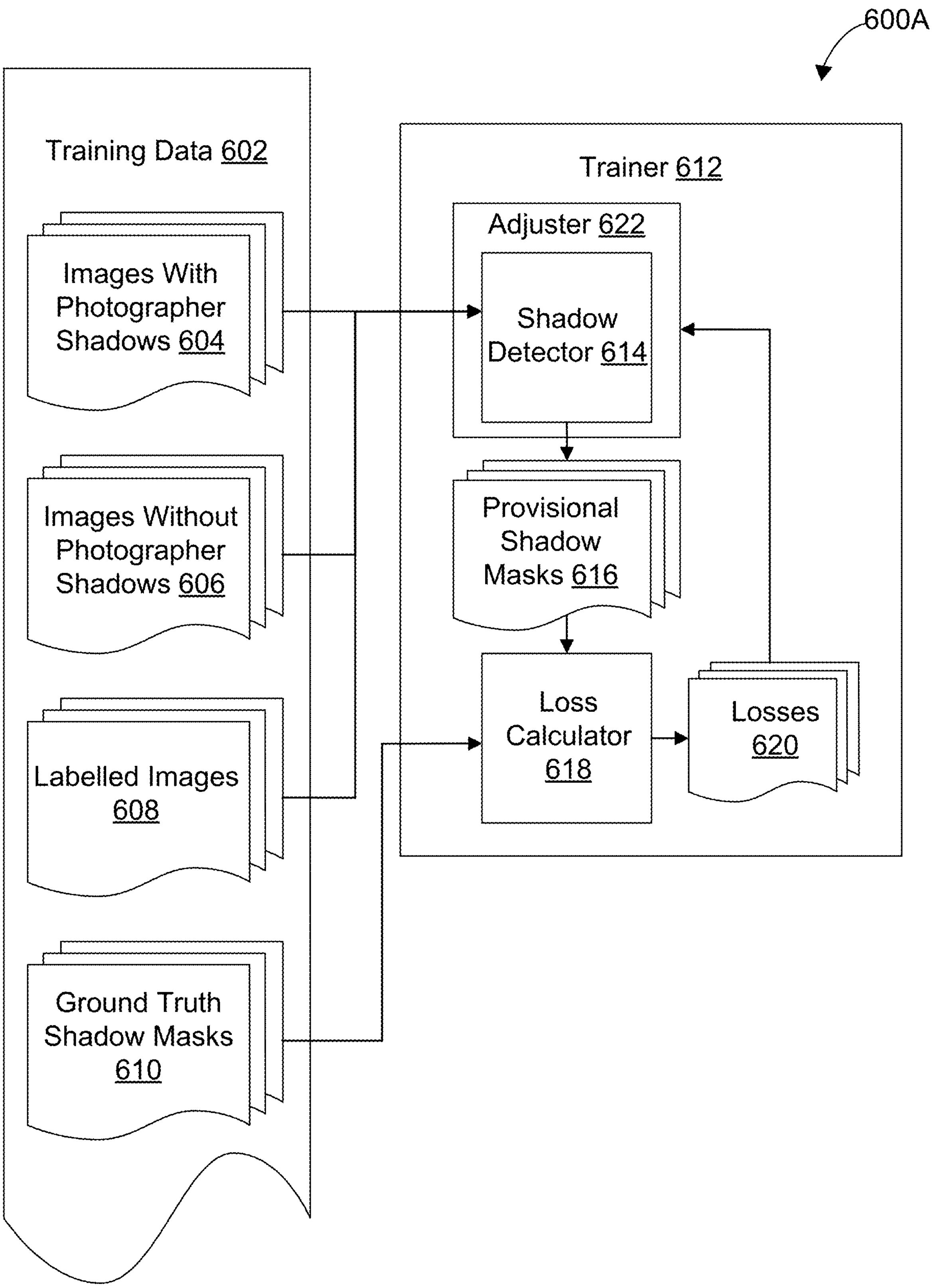
FIG. 6A is a block diagram illustrating an example system that may be used to train a shadow detector, according to various aspects of the present disclosure.

FIG. 6A is a block diagram illustrating an example system 600A that may be used to train a shadow detector 614, according to various aspects of the present disclosure. Shadow detector 614 may be an example of a module of shadow remover 206 of FIG. 2. Additionally or alternatively, shadow detector 614 may be described to describe tasks related to detecting shadows that may be performed by shadow remover 206.

System 600A may include a trainer 612 that may train shadow detector 614 (according to an iterative back-propagation training process) to generate shadow masks 626 based on images 624. For example, system 600A may obtain training data 602. Training data 602 may include images 604 (e.g., images with photographer shadows), images 606 (e.g., versions of images 604 without photographer shadows), labelled images 608 (e.g., versions of images 604 with photographer shadows labelled), and ground truth shadow masks 610. Training data 602 may include any number of each of images 604, images 606, labelled images 608, and ground truth shadow masks 610. Each of images 606, labelled images 608, and ground truth shadow masks 610 may correspond to one of images 604. For example, an example one of images 604 may represent a scene with a photographer shadow. A corresponding one of images 606 may represent the same scene, without the photographer shadow. A corresponding one of labelled images 608 may be the one of images 604, with the photographer shadow labeled or annotated. A corresponding one of ground truth shadow masks 610 may be, or may include, a mask indicating pixels of the one of 604 that represent the photographer shadow (e.g., are darker by reason of the photographer shadow).

Trainer 612 may provide images 604 (e.g., one at a time) to shadow detector 614 (which may be nascent during the training of shadow detector 614). Shadow detector 614 may generate provisional shadow masks 616 (e.g., one at a time) based on the provided images 604. Additionally or alternatively, trainer 612 may provide images 606 (e.g., one at a time) to shadow detector 614, for example, as examples of images 604 without photographer shadows. In some aspects, trainer 612 may use images 604 and images 606 in a contrastive learning approach to train shadow detector 614.

A loss calculator 618 may compare provisional shadow masks 616 (e.g., one at a time) with corresponding ones of ground truth shadow masks 610 and determine (e.g., one at a time) losses 620 based on differences between provisional shadow masks 616 and ground truth shadow masks 610. An adjuster 622 may adjust parameters (e.g., weights) of shadow detector 614 based on losses 620, for example, to decrease losses 620 in further iterations of the training procedure (e.g., according to a gradient descent iterative training process).

Figure 6B:
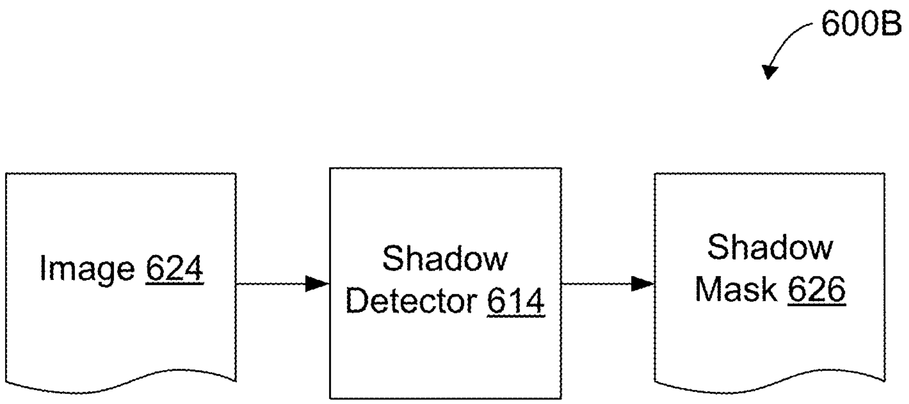
FIG. 6B is a block diagram illustrating an example system including a shadow detector, according to various aspects of the present disclosure.

After being trained, shadow detector 614 may be deployed, for example, in a system 600B of FIG. 6B. At an inference stage of operation, shadow detector 614 may be used (e.g., in system 600B) to determine a shadow mask 626 based on a provided image 624. A shadow mask 626 may be indicative of which pixels of image 624 represent a photographer shadow (e.g., which pixels of image 624 are darker because a photographer shadow falls on a point in the scene represented by the pixels).

Figure 7A:
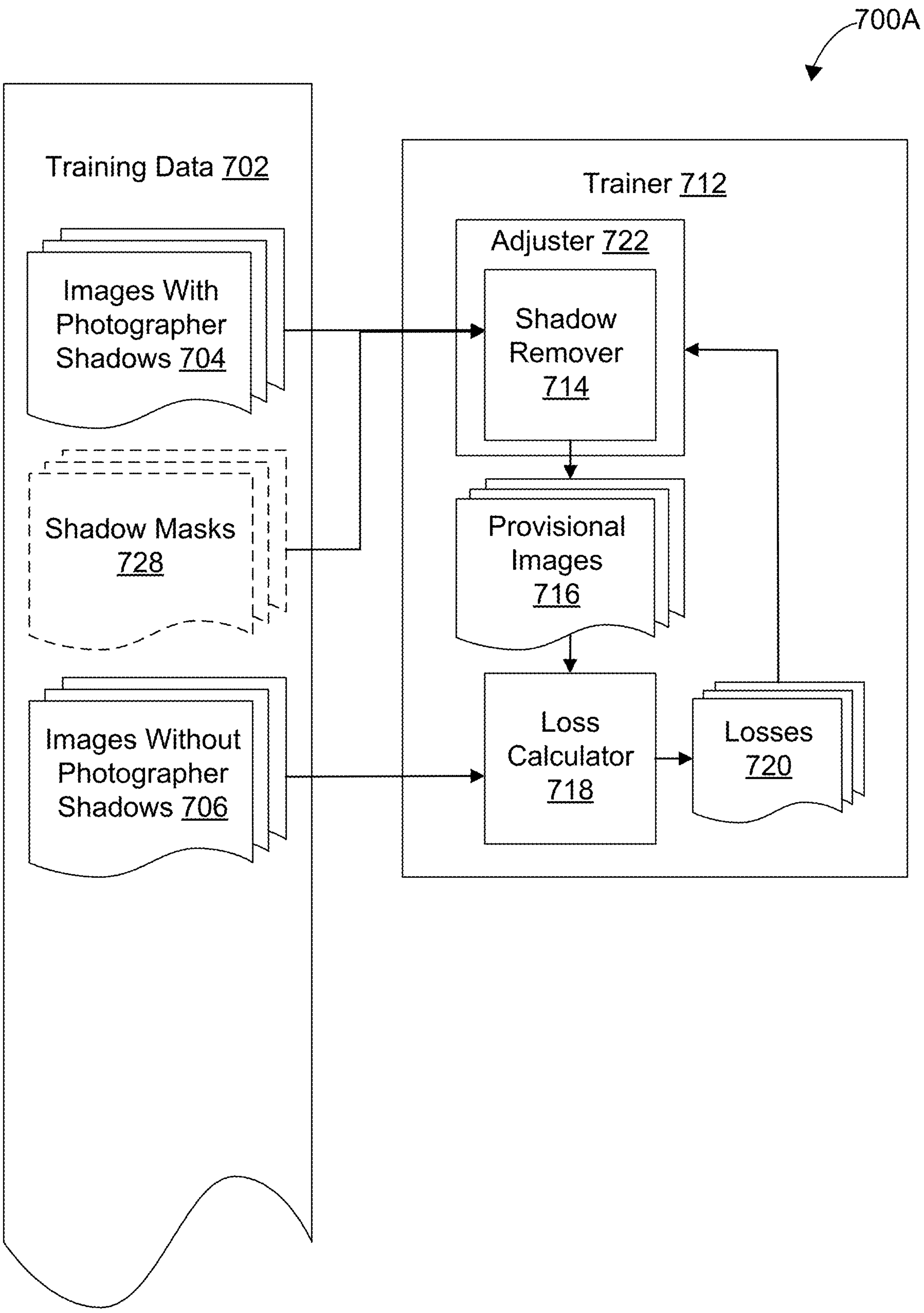
FIG. 7A is a block diagram illustrating an example system that may be used to train a shadow remover, according to various aspects of the present disclosure.

FIG. 7A is a block diagram illustrating an example system 700A that may be used to train a shadow remover 714, according to various aspects of the present disclosure. Shadow remover 714 may be an example of a module of shadow remover 206 of FIG. 2. Additionally or alternatively, shadow remover 714 may be described to describe tasks related to removing shadows that may be performed by shadow remover 206.

Turning to FIG. 7A, system 700A may include a trainer 712 that may train shadow remover 714 (according to an iterative back-propagation training process) to generate images 726 based on images 724. For example, system 700A may obtain training data 702. Training data 702 may include images 704 (e.g., images with photographer shadows) and images 706 (e.g., versions of images 704 without photographer shadows). Training data 702 may include any number of each of images 704 and images 706. Each of images 706 may correspond to one of images 704. For example, an example one of images 704 may represent a scene with a photographer shadow. A corresponding one of images 706 may represent the same scene, without the photographer shadow.

Trainer 712 may provide images 704 (e.g., one at a time) to shadow remover 714 (which may be nascent during the training of shadow remover 714). Shadow remover 714 may generate provisional images 716 (e.g., one at a time) based on the provided images 704.

A loss calculator 718 may compare provisional images 716 (e.g., one at a time) with corresponding ones of images 706 and determine (e.g., one at a time) losses 720 based on differences between provisional images 716 and images 706. An adjuster 722 may adjust parameters (e.g., weights) of shadow remover 714 based on losses 720, for example, to decrease losses 720 in further iterations of the training procedure (e.g., according to a gradient descent iterative training process).

Figure 7B:
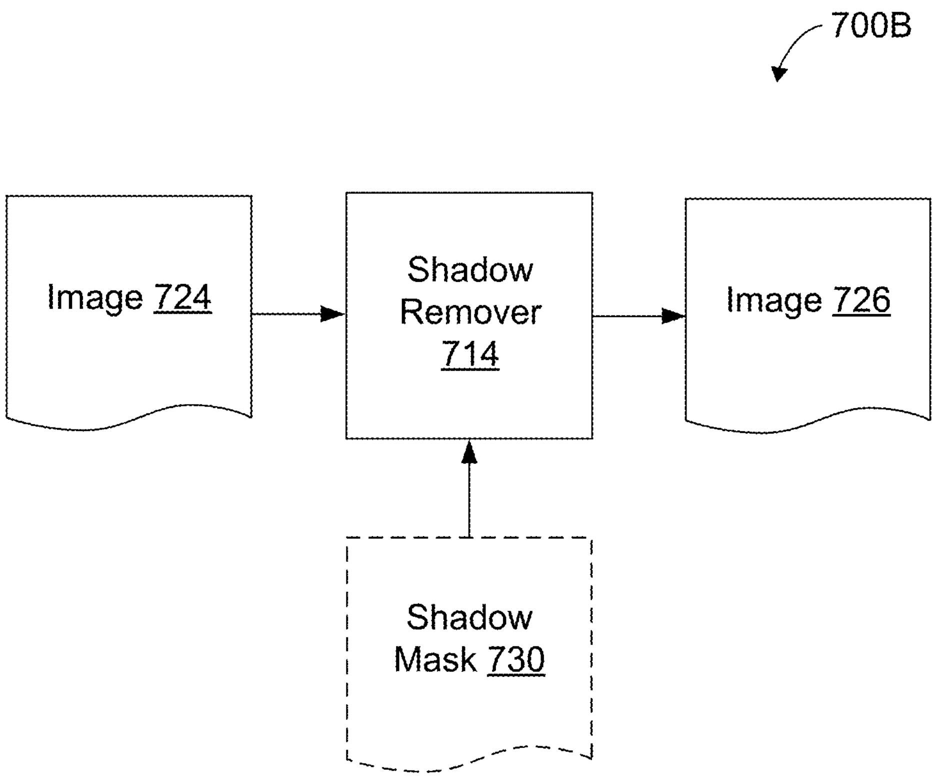
FIG. 7B is a block diagram illustrating an example system including a shadow remover, according to various aspects of the present disclosure.

After being trained, shadow remover 714 may be deployed, for example, in a system 700B of FIG. 7B. At an inference stage of operation, shadow remover 714 may be used (e.g., in system 700B) to generate an image 726 based on a provided image 724. Image 726 may be a version of image 724 without a photographer shadow (e.g., with pixels that were darkened by the photographer shadow in image 724 brightened).

Because shadow remover 714 is trained using images 704 (including photographer shadows) and images 706 (not including photographer shadows), shadow remover 714 is trained to remove photographer shadows. Shadow remover 714 is trained to not remove natural shadows (e.g., shadows that are not photographer shadows) from images.

In some aspects, shadow remover 714 may generate an image 726 based on an image 724 and a corresponding shadow mask 730. For example, in some aspects, shadow remover 714 may be trained to generate images 726 based on images and corresponding shadow masks. For example, during training, shadow remover 714 may be provided with images 704 and shadow masks 728 corresponding to images 704. Shadow masks 728 may indicate pixels of images 704 that represent shadows (e.g., photographer shadows). Shadow masks 728 may be generated, for example, by a shadow detector (such as shadow detector 614 of system 600B of FIG. 6B). Shadow remover 714 may generate provisional images 716 based on images 704 and shadow masks 728. Loss calculator 718 may determine losses 720 based on differences between provisional images 716 and images 706 and adjuster 722 may adjust shadow remover 714 based on losses 720.

In some aspects, shadow remover 206 of FIG. 2 may include a shadow detector 614 and a shadow remover 714. In such cases, the shadow detector 614 of shadow remover 206 may provide a shadow mask 626 to the shadow remover 714 of shadow remover 206 and the shadow remover 714 of shadow remover 206 may generate image 208 based on the provided shadow mask 626 (e.g., using shadow mask 626 as shadow mask 730 system 700B of FIG. 7B).

Figure 8:
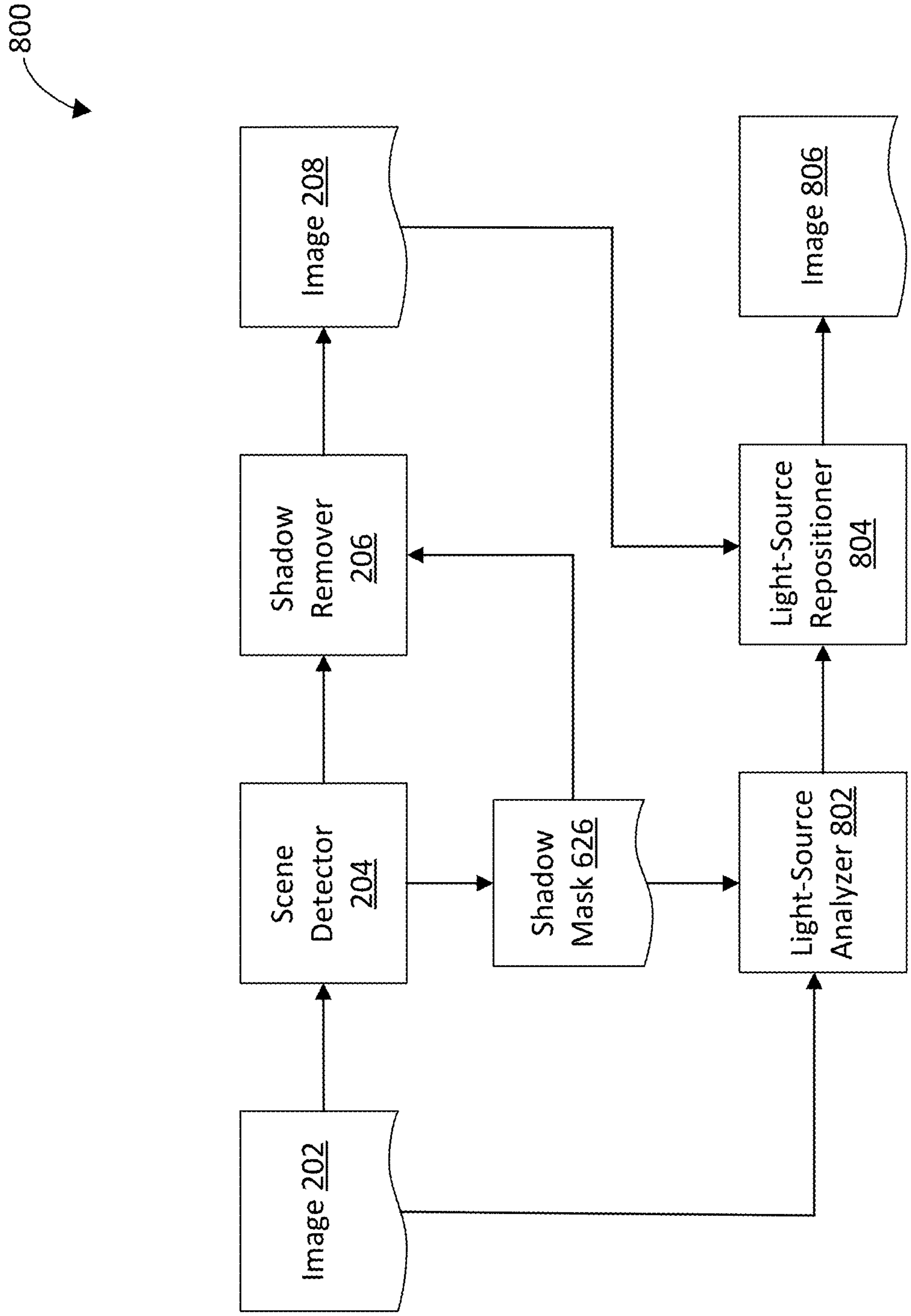
FIG. 8 is a block diagram illustrating a system that may modify an image, according to various aspects of the present disclosure.

FIG. 8 is a block diagram illustrating a system 800 that may modify an image 202 to generate image 208, according to various aspects of the present disclosure. For example, system 800 may selectively remove shadows from image 202 to generate image 208. In some aspects, shadow remover 206 may remove shadows from image 202 based on shadow mask 626. Additionally, system 800 may modify image 208 to generate image 806, according to various aspects of the present disclosure. For example, system 800 may alter pixels of image 208 such that image 806 appears to have been capture under different lighting conditions than the lighting conditions in which image 202 was captured. System 800 may be implemented in image-processing system 100 of FIG. 1, for example, in image processor 124 of image-processing device 104 of FIG. 1.

A light-source analyzer 802 of system 800 may analyze image 202 (and/or other information, such as distance or depth information to objects in the scene, a tilt angle of a device that captured image 202, and/or shadow mask 626) to determine light-source position information. Light-source analyzer 802 may be, or may include, a machine-learning model trained to determine light-source information based on images and/or shadow masks.

A light-source repositioner 804 of system 800 may alter image 208 to cause image 806 to appear as if image 806 were image 208 captured under different lighting conditions. For example, light-source repositioner 804 may cause image 806 to appear as the scene represented by image 208 had been illuminated by a light source at a different position than the light source was in with relation to the scene represented by image 202. Additionally or alternatively, light-source repositioner 804 may cause image 806 to appear as if the light source that illuminated the scene represented by image 202 had a different intensity and/or hue. Light-source repositioner 804 may be, or may include, a machine-learning model trained to generate images under altered lighting conditions.

Figure 9:
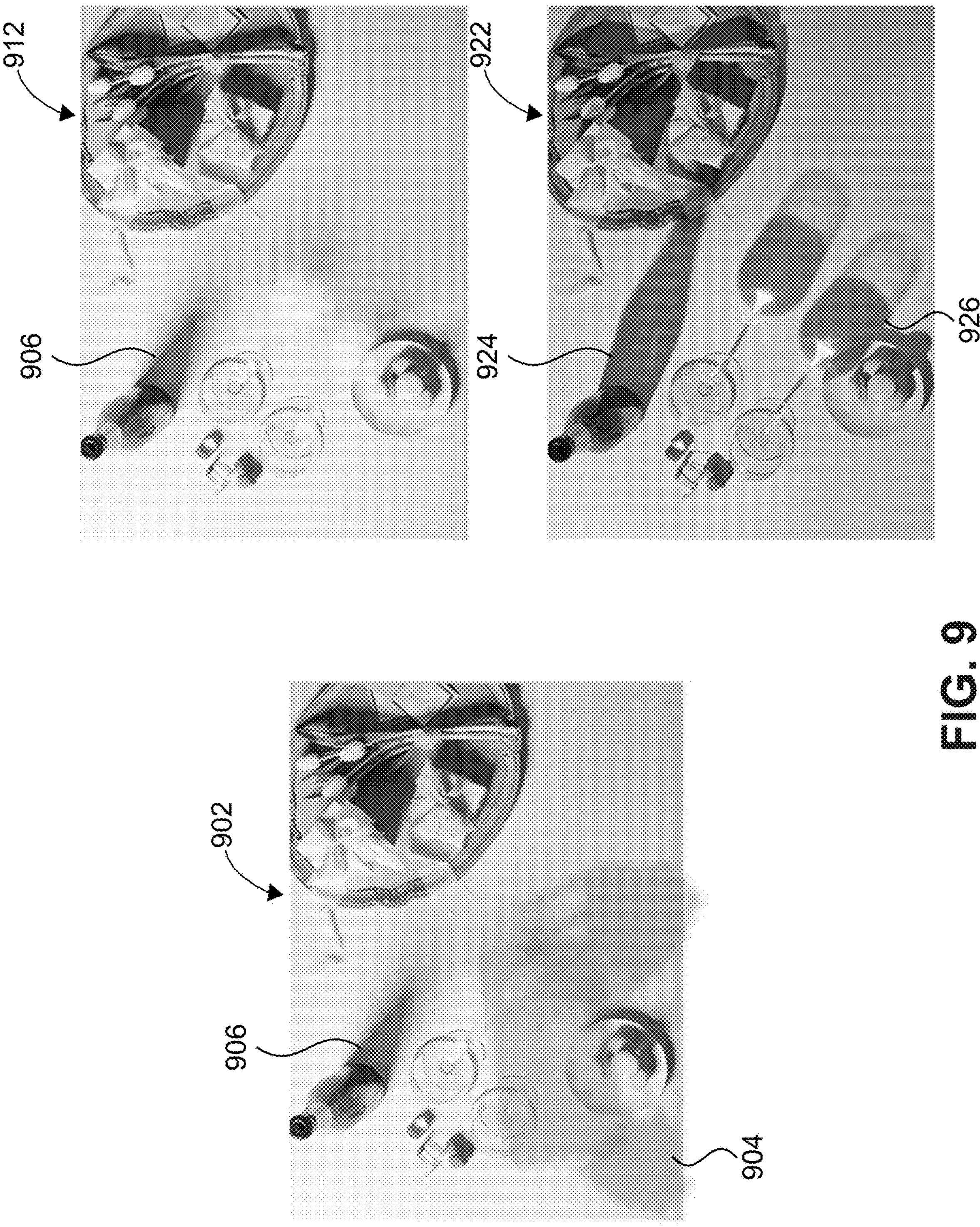
FIG. 9 includes a first image with a photographer shadow, a second image without the photographer shadow, and a third image without the photographer shadow and with lighting altered; the photographer shadow removed and the lighting altered according to various aspects of the present disclosure.

For example, FIG. 9 includes an image 902 including a shadow 904 (which may be a photographer shadow) and a shadow 906 (which may be a natural shadow). Image 902 may be an example of image 202 of FIG. 2 and/or FIG. 8. FIG. 9 includes an image 912 including shadow 906 but not shadow 904. Image 912 may be an example of image 902, if image 902 were altered to remove shadow 904. For example, image 912 may be an example of image 208 of FIG. 2 and/or FIG. 8.

FIG. 9 also includes image 922 including shadow 924 and shadow 926. Shadow 924 and shadow 926 may be natural shadows (e.g., not photographer shadows). Image 922 may be an altered version of image 902 or image 912. For example, image 922 may be an example of image 806 of FIG. 8. Image 922 may have been altered, for example, to simulate changing the light source that illuminated the scene represented by image 902. For example, image 922 may have been altered to simulate moving the light source to a different position, changing an intensity of the light source, and/or changing a hue of the light source.

Figure 10:
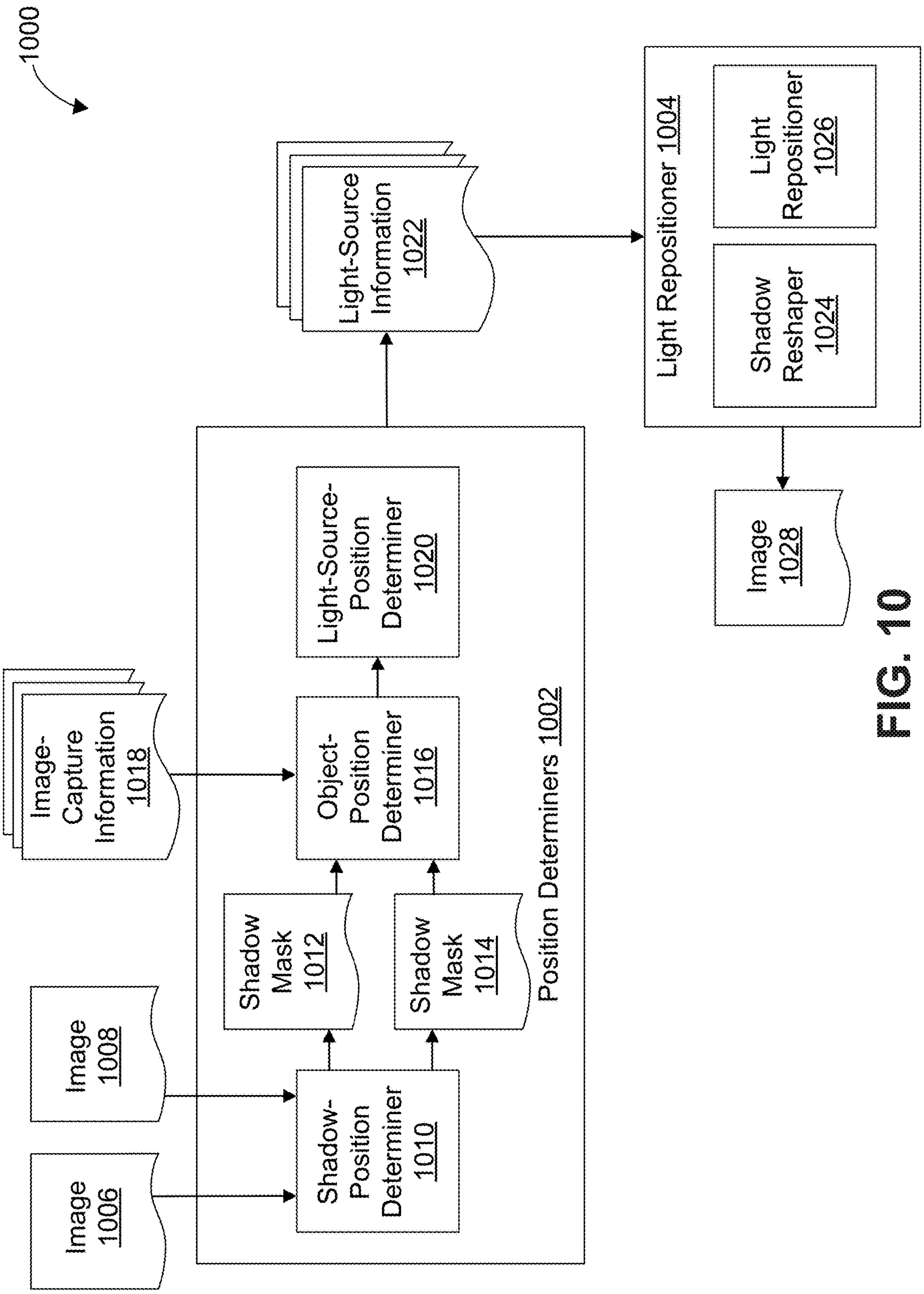
FIG. 10 is a block diagram illustrating an example system that may determine light-source information and generate image, according to various aspects of the present disclosure.

FIG. 10 is a block diagram illustrating an example system 1000 that may determine light-source information 1022 and generate image 1028, according to various aspects of the present disclosure. System 1000 includes position determiners 1002 which may be an example of light-source analyzer 802 of FIG. 8. System 1000 also includes light repositioner 1004 which may be an example of light-source repositioner 804 of FIG. 8.

Position determiners 1002 may analyze a light source in image 1006. For example, position determiners 1002 may determine a relative position of the light source of image 1006 (e.g., relative to a scene or subject of image 1006). Accordingly, light-source information 1022 may include information regarding a position of a light source relative to a scene, or subject, of image 1006.

For example, shadow-position determiner 1010 may determine one or more shadow masks based on one or more images. For instance, shadow-position determiner 1010 may determine shadow mask 1012 based on image 1006 and shadow mask 1014 based on image 1008. Shadow-position determiner 1010 may be, or may include, for example, shadow detector 614 of system 600B of FIG. 6B. As such, image 1006 and image 1008 may be examples of image 624 of system 600B of FIG. 6B and shadow mask 1012 and shadow mask 1014 may be examples of shadow mask 626 of system 600B of FIG. 6B.

Image 1006 and image 1008 may be sequential images of the same scene. In some aspects, image 1006 and image 1008 may be captured as a burst capture. In some aspects, image 1006 and image 1008 may be sequential frames of video data. In some aspects, one of image 1006 and image 1008 may be a preview image (e.g., captured for display prior to a shutter button being pressed to capture the other of image 1006 and image 1008). A device that captures image 1006 and image 1008 may move between capturing image 1006 and image 1008. For example, based on hand motion (e.g., based on the instability of a hand holding the device, which may be referred to as hand shake), the device may move between a first time when image 1006 is captured and a second time when image 1008 is captured.

Image-capture information 1018 may be, or may include, motion data, (e.g., from a gyro sensor and/or inertial measurement unit (IMU) of a device used to capture image 1006), depth information (e.g., based on a focus setting of a device used to capture image 1006 and/or from a depth sensor), and/or a device angle (e.g., based on an orientation sensor, such as an IMU, of the device used to capture image 1006). Image-capture information 1018 may include information (e.g., motion data, depth information, and/or angle information) related to image 1006 and/or image 1008. For example, image-capture information 1018 may include information corresponding to the time that image 1006 was captured and/or to the time that image 1008 was captured.

Object-position determiner 1016 can determine positions of objects in a scene. For instance, because shapes of objects are different in image 1006 than in image 1008, (based on image 1006 and image 1008 being captured from two different positions), object-position determiner 1016 may determine boundaries of the objects. For example, object-position determiner 1016 may use optical flow techniques (e.g., measuring changes in pixel positions of pixels representing the same object between images) and image-capture information 1018 (including positions from which image 1006 and image 1008 were captured) to determine positions of the objects in image 1006 and image 1008. For instance, object-position determiner 1016 may, through three-dimensional geometric techniques (e.g., triangulation) determine positions of objects in a scene represented by image 1006 and image 1008. In some aspects, light-source-position determiner 1020 may be, or may include, a machine-learning model trained to determine object-position information based on images, shadow masks, and/or image-capture information. For example, due to different capture angle (e.g., of image 1006 and image 1008), object boundaries in different images may be different. By calculating a differential, object boundaries can be detected as a base of relighting. Light source change may be based on object boundaries.

Light-source-position determiner 1020 can determine light-source information 1022 based on the positions of objects in the scene, image 1006, image 1008, shadow mask 1012, and/or shadow mask 1014. For example, based on differences in shadows and/or differences in exposures between image 1006 and image 1008, light-source-position determiner 1020 can determine a position of a light source that illuminated image 1006 and image 1008 via a large brightness/luma difference.

Figure 11:
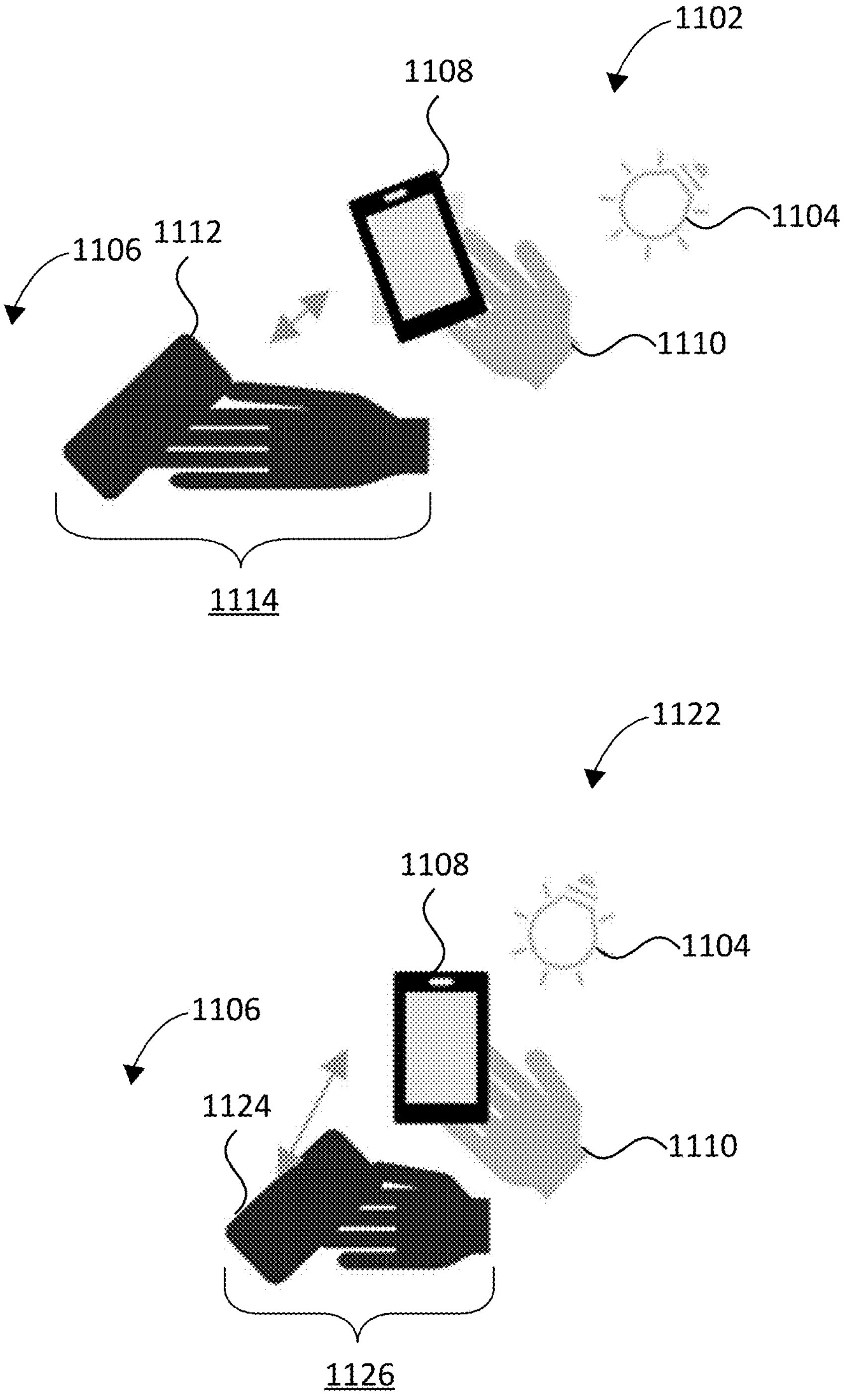
FIG. 11 includes two diagrams of two respective scenarios in which a light source illuminates a scene to illustrate various concepts related to the present disclosure.

For example, FIG. 11 includes a diagram of a scenario 1102 in which light source 1104 illuminates a scene 1106. Handheld device 1108 and hand 1110 are positioned between light source 1104 and scene 1106 such that handheld device 1108 and hand 1110 cast shadow 1112 (e.g., a photographer shadow) into scene 1106. Based on the relative position of light source 1104, handheld device 1108 and hand 1110, and a surface of scene 1106 onto which shadow 1112 is cast in scenario 1102, shadow 1112 has length 1114.

FIG. 11 includes a diagram of a scenario 1122 in which light source 1104 illuminates scene 1106. Handheld device 1108 and hand 1110 are positioned between light source 1104 and scene 1106 such that handheld device 1108 and hand 1110 cast shadow 1124 (e.g., a photographer shadow) into scene 1106. Based on the relative position of light source 1104, handheld device 1108 and hand 1110, and a surface of scene 1106 onto which shadow 1124 is cast in scenario 1122, shadow 1124 has length 1126.

Handheld device 1108 and hand 1110 may be in a different position in scenario 1122 than in scenario 1102. As such, shadow 1124 may have a length 1126 which may be different than length 1114 of shadow 1112.

Returning to FIG. 10, light-source-position determiner 1020 may use differences and/or differences in exposures between two captured images (e.g., image 1006 and image 1008) to determine a light source direction and/or food shadow position. By using optical flow and/or calculating luminance differences, original light source direction can be estimated. With light source direction, a different light direction can be generated for different purpose. Because image 1006 and image 1008 are captured under different exposure and/or hand-shake conditions, luma differences between image 1006 and image 1008 may indicate the position of a light source. For example, using scenario 1102 and scenario 1122 of FIG. 11 as an example, light-source-position determiner 1020 may determine light-source information 1022 (e.g., including a position of light source 1104 relative to scene 1106 and/or handheld device 1108) based on length 1114 of shadow 1112 (e.g., a shadow in image 1006 as identified by shadow mask 1012) and length 1126 of shadow 1124 (e.g., a shadow in image 1008 as identified by shadow mask 1014). In some aspects, light-source-position determiner 1020 may be, or may include, a machine-learning model trained to determine light-source information based on images, image masks, and/or shadow masks.

Light repositioner 1004 may alter image 1006 to generate image 1028. For example, light repositioner 1026 and shadow reshaper 1024 of light repositioner 1004 may alter image 1006 in such a way that image 1028 appears like image 1006 as if a light source which lit a scene represented by image 1006 were changed. For example, light repositioner 1004 may receive light-source information 1022 from position determiners 1002. light-source information 1022 may include light-source direction and food-shadow position information. Light repositioner 1004 may modify an intensity of light, for example, according to a desired atmosphere (e.g., soft light or strong light). Shadow reshaper 1024 and light repositioner 1026 of light repositioner 1004 may adopt tone mapping to adjust the lighting environment of image 1006 and/or shadow degrees of image 1006 by altering light-source intensity and/or food-shadow positions. In some aspects, light repositioner 1004 may alter image 1006 based on user inputs. In some aspects, shadow reshaper 1024 may be, or may include, a machine-learning model trained to modify images to reshape shadows (e.g., natural shadows) in the images based on altered lighting information. In some aspects, light repositioner 1026 may be, or may include, a machine-learning model trained to modify images in to alter lighting in the images. For instance, around detected object boundaries, based on user's selection, a light source direction can be altered to generate corresponding shadow region for different purpose.

Figure 12:
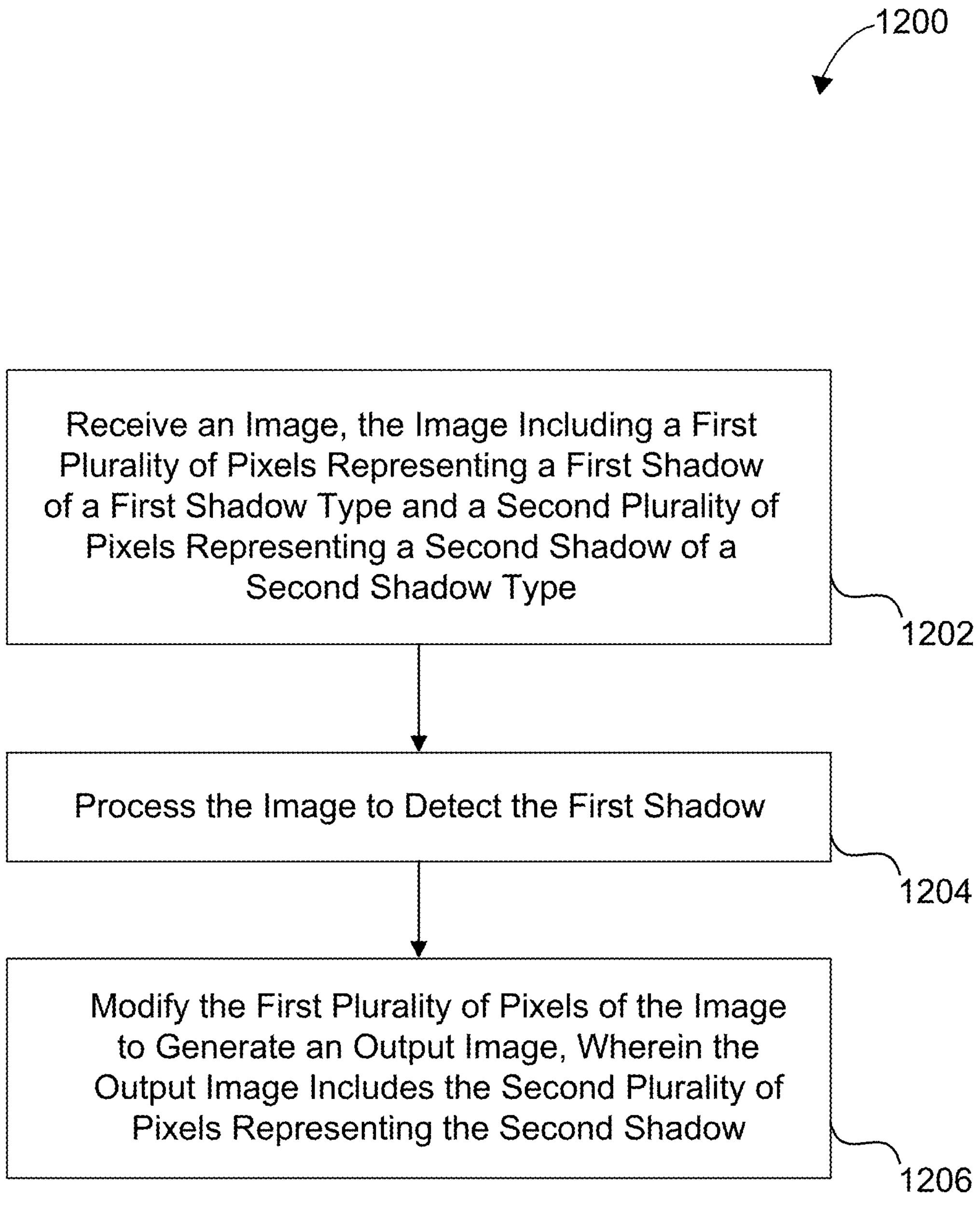
FIG. 12, is a flow diagram illustrating an example process for modifying images, in accordance with aspects of the present disclosure.

FIG. 12, is a flow diagram illustrating a process 1200 for modifying images, in accordance with aspects of the present disclosure. One or more operations of process 1 200 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 1200. The one or more operations of process 1200 may be implemented as software components that are executed and run on one or more processors.

At block 1202, a computing device (or one or more components thereof) may receive an image, the image including a first plurality of pixels representing a first shadow of a first shadow type and a second plurality of pixels representing a second shadow of a second shadow type. For example, system 200 of FIG. 2 or system 800 of FIG. 8 may receive image 202. Image 202 may include a pixels representing a first shadow (e.g., a photographer shadow) and pixels representing a second shadow (e.g., a natural shadow-not a photographer shadow).

At block 1204, the computing device (or one or more components thereof) may process the image to detect the first shadow. For example, shadow remover 206 of FIG. 2 or FIG. 8 may detect first shadow (e.g., the photographer shadow) in image 202.

In some aspects, the first shadow type may be, or may include, shadows cast by at least one of: a hand of a person operating a handheld device to capture the image; the handheld device used to capture the image; or a head of the person. For example, shadow 304, shadow 314, shadow 318, shadow 324, and shadow 334 of FIG. 3 are examples of the first type of shadow.

In some aspects, the first shadow may be detected based on a user input. For example, image 502 may be displayed to a user. The user may select shadow 504 in image 502 (e.g., using a touch-screen display). Shadow 504 may be detected based on the user input.

In some aspects, the first plurality of pixels of the image may be determined using a machine-learning model trained to identify shadows of the first shadow type in images. For example, shadow remover 206 of FIG. 2 or FIG. 8 may be, or may include, a machine-learning model trained to determine photographer shadows.

In some aspects, the computing device (or one or more components thereof) may determine that an image is a candidate for shadow removal based on image-capture conditions related to the image. For example, scene detector 204 of FIG. 2 or FIG. 8 may determine that image 202 is a candidate for shadow removal based on image-capture conditions related to image 202.

In some aspects, the image-capture conditions may be, or may include, at least one of: a focus setting used to capture the image; an exposure setting used to capture the image; a tilt angle of a device used to capture the image; a subject of the image being stationary; or a classification of the image by an image classifier. For example, scene detector 204 of FIG. 2 or FIG. 8 may determine that image 202 is a candidate for shadow removal based on a focus setting used to capture the image, an exposure setting used to capture the image, a tilt angle of a device used to capture the image, a subject of the image being stationary, and/or a classification of the image by an image classifier.

In some aspects, the image may be determined to be a candidate for shadow removal using a machine-learning model trained to identify candidate images for shadow removal based on at least one of: a focus setting used to capture of the image; an exposure setting used to capture the image; a tilt angle of a device used to capture the image; or a subject of the image being stationary. For example, scene detector 204 of FIG. 2 or FIG. 8 may include a machine-learning model trained to determine candidates for shadow removal based on a focus setting used to capture of the image, an exposure setting used to capture the image, a tilt angle of a device used to capture the image, and/or a subject of the image being stationary.

In some aspects, the image may be determined to be a candidate for shadow removal by a machine-learning model trained to identify shadows of the first shadow type in images. For example, scene detector 204 of FIG. 2 or FIG. 8 may be, or may include, a machine-learning model trained to detect photographer shadows.

At block 1206, the computing device (or one or more components thereof) may modify the first plurality of pixels of the image to generate an output image, wherein the output image includes the second plurality of pixels representing the second shadow. For example, shadow remover 206 of FIG. 2 or FIG. 8 may remove the first shadow (e.g., the photographer shadow) from image 202 while not removing the second shadow to generate image 208.

In some aspects, the image may include a third plurality of pixels representing the first shadow and the second shadow and wherein the third plurality of pixels are modified to reduce the first shadow in the third plurality of pixels. For example, region 508 of image 502 of FIG. 5 may include pixels representing shadow 504 and shadow 506. When modified, for example, as image 512, region 508 may include pixels representing shadow 506 but not shadow 504.

In some aspects, the third plurality of pixels may be modified to preserve the second shadow. For example, region 508 of image 512 may include pixels representing shadow 506.

In some aspects, the first plurality of pixels of the image may be modified using a machine-learning model trained to remove shadows of the first shadow type from images. For example, shadow remover 206 of FIG. 2 or FIG. 8 may be, or may include, a machine-learning model trained to remove photographer shadows from images.

In some aspects, the computing device (or one or more components thereof) may analyze a light source that resulted in the first shadow; and modify, based on analyzing the light source, the image to simulate a change to the light source. For example, light-source analyzer 802 of FIG. 8 may analyze a light source that resulted in the first shadow and light-source repositioner 804 of FIG. 8 may modify image 208 to simulate a change to the light source.

In some aspects, image may be modified to simulate a change to at least one of: a position of the light source; an intensity of the light source; or a hue of the light source. For example, light-source repositioner 804 of FIG. 8 may modify image 208 to simulate a change to a position of the light source, an intensity of the light source, and/or a hue of the light source.

In some aspects, the image may be a first image captured by a device at a first position. The light source may be analyzed based on a second image captured by the device at a second position; and a third plurality of pixels that represent the first shadow in the second image. For example, light-source analyzer 802 may analyze the light source based on multiple images e.g., as described with regard to FIG. 11.

In some aspects, the image may be modified using a tone-mapping algorithm. For example, shadow remover 206 of FIG. 2 or FIG. 8 may implement a tone-mapping algorithm.

Figure 13:
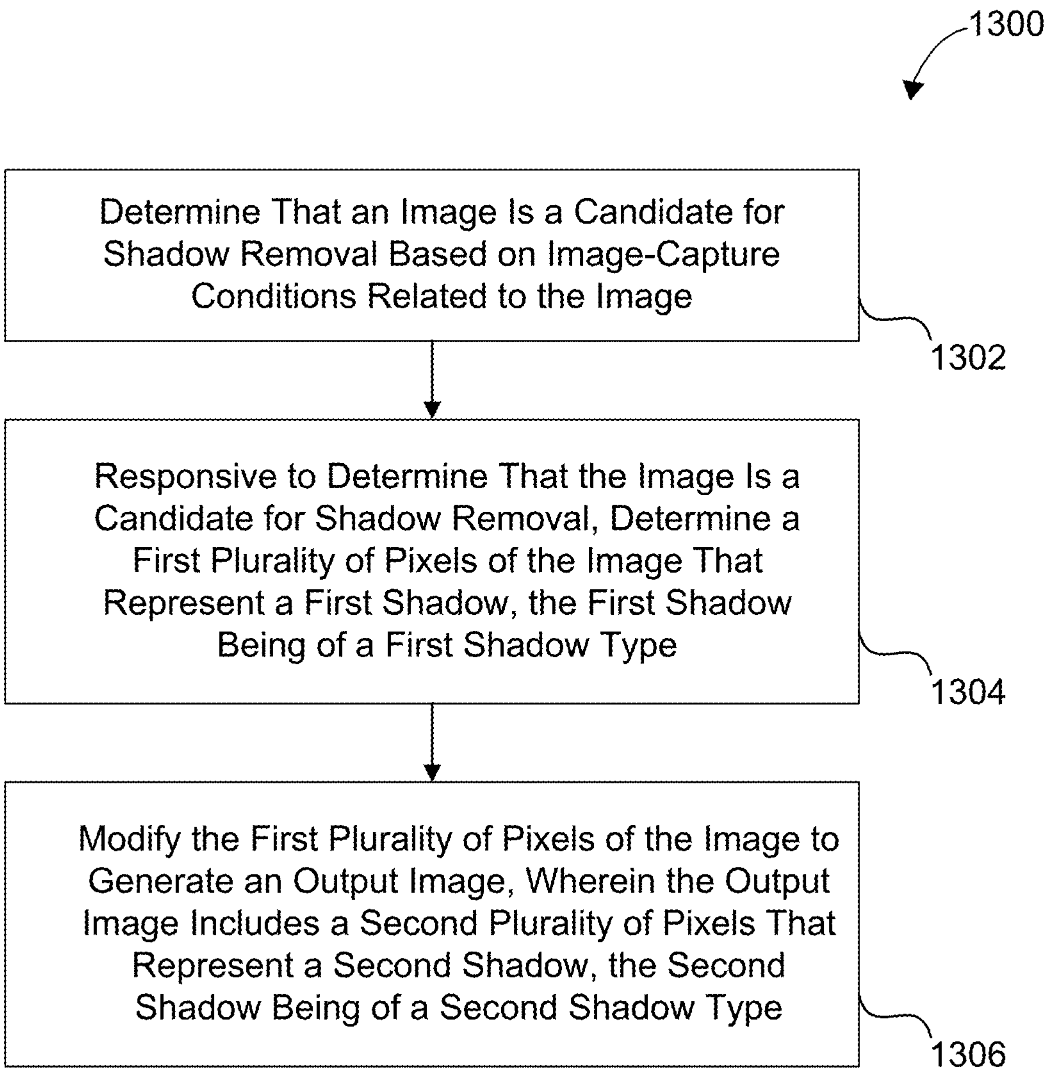
FIG. 13 is a flow diagram illustrating another example process for modifying images, in accordance with aspects of the present disclosure.

FIG. 13 is a flow diagram illustrating a process 1300 for modifying images, in accordance with aspects of the present disclosure. One or more operations of process 1300 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 1300. The one or more operations of process 1300 may be implemented as software components that are executed and run on one or more processors.

At block 1302, a computing device (or one or more components thereof) may determine that an image is a candidate for shadow removal based on image-capture conditions related to the image. For example, scene detector 204 of FIG. 2 or FIG. 8 may determine that image 202 is a candidate for shadow removal based on image-capture conditions related to image 202.

In some aspects, the image-capture conditions may be, or may include, at least one of: a focus setting used to capture the image; an exposure setting used to capture the image; a tilt angle of a device used to capture the image; a subject of the image being stationary; or a classification of the image by an image classifier. For example, scene detector 204 of FIG. 2 or FIG. 8 may determine that image 202 is a candidate for shadow removal based on a focus setting used to capture the image, an exposure setting used to capture the image, a tilt angle of a device used to capture the image, a subject of the image being stationary, and/or a classification of the image by an image classifier.

In some aspects, the image may be determined to be a candidate for shadow removal using a machine-learning model trained to identify candidate images for shadow removal based on at least one of: a focus setting used to capture of the image; an exposure setting used to capture the image; a tilt angle of a device used to capture the image; or a subject of the image being stationary. For example, scene detector 204 of FIG. 2 or FIG. 8 may include a machine-learning model trained to determine candidates for shadow removal based on a focus setting used to capture of the image, an exposure setting used to capture the image, a tilt angle of a device used to capture the image, and/or a subject of the image being stationary.

In some aspects, the image may be determined to be a candidate for shadow removal by a machine-learning model trained to identify shadows of the first shadow type in images. For example, scene detector 204 of FIG. 2 or FIG. 8 may be, or may include, a machine-learning model trained to detect photographer shadows.

At block 1304, the computing device (or one or more components thereof) may, responsive to determine that the image is a candidate for shadow removal, determine a first plurality of pixels of the image that represent a first shadow, the first shadow being of a first shadow type. For example, shadow remover 206 of FIG. 2 or FIG. 8 may determine that a first plurality of pixels of image 202 represent a photographer shadow.

At block 1306, the computing device (or one or more components thereof) may modify the first plurality of pixels of the image to generate an output image, wherein the output image includes a second plurality of pixels that represent a second shadow, the second shadow being of a second shadow type. For example, shadow remover 206 of FIG. 2 or FIG. 8 may modify the first plurality of pixels of image 202 to generate image 208. Shadow remover 206 may modify the pixels of image 202 to remove the photographer shadow. Shadow remover 206 may modify to remove the photographer shadow without removing a natural shadow of image 202.

In some examples, as noted previously, the methods described herein (e.g., process 1200 of FIG. 12, process 1300 of FIG. 13, and/or other methods described herein) can be performed, in whole or in part, by a computing device or apparatus. In one example, one or more of the methods can be performed by system 200 of FIG. 2, system 800 of FIG. 8, system 1000 of FIG. 10, or by another system or device. In another example, one or more of the methods (e.g., process 1200 of FIG. 12, 1300 of FIG. 13, and/or other methods described herein) can be performed, in whole or in part, by the computing-device architecture 1600 shown in FIG. 16. For instance, a computing device with the computing-device architecture 1600 shown in FIG. 16 can include, or be included in, the components of the system 200, system 800, and/or system 1000 and can implement the operations of process 1200, process 1300, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component (s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 1200, process 1300, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1200, process 1300, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

As noted above, various aspects of the present disclosure can use machine-learning models or systems.

Figure 14:
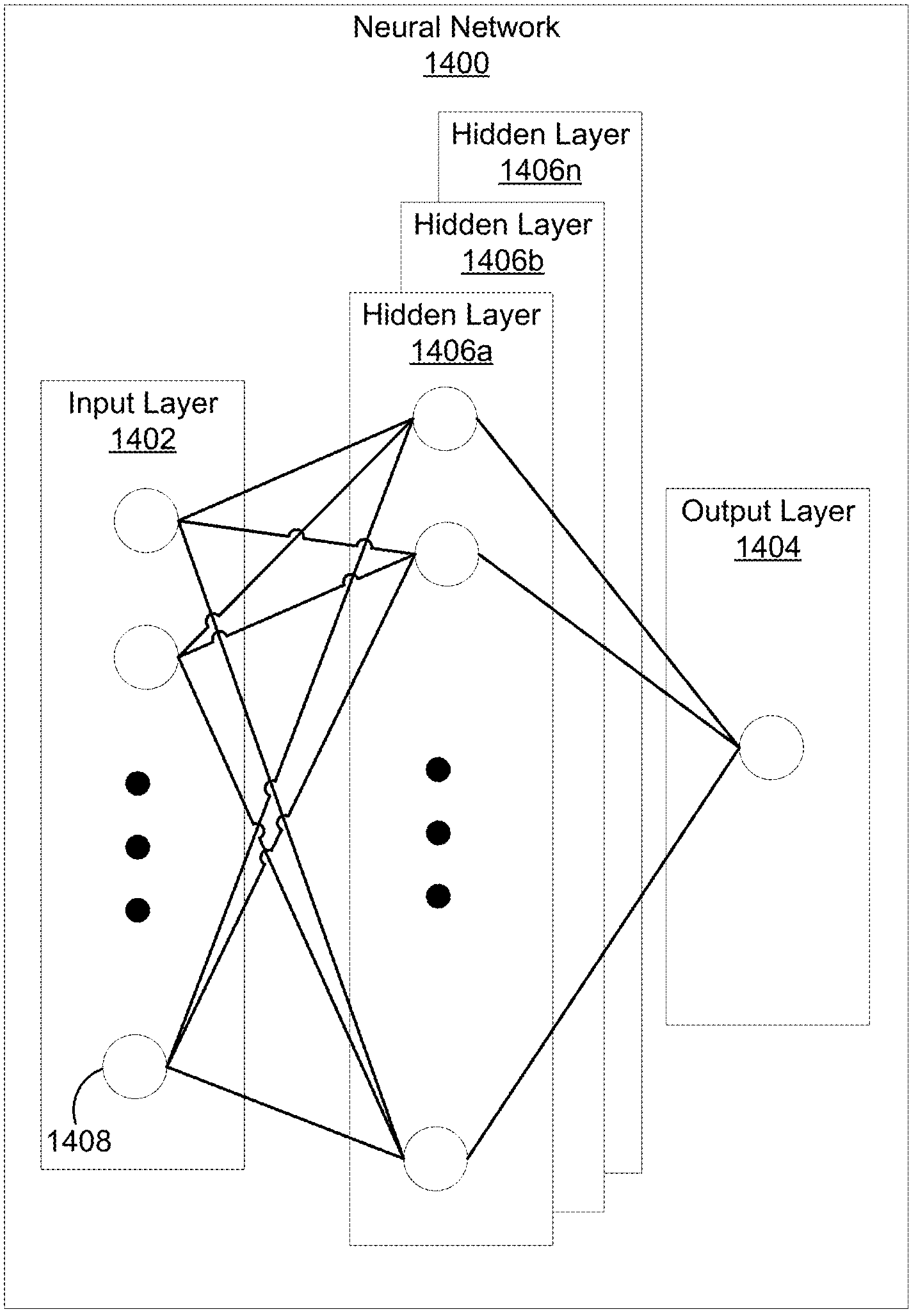
FIG. 14 is a block diagram illustrating an example of a deep learning neural network that can be used to perform various tasks, according to some aspects of the disclosed technology.

FIG. 14 is an illustrative example of a neural network 1400 (e.g., a deep-learning neural network) that can be used to implement machine-learning based feature segmentation, implicit-neural-representation generation, rendering, classification, object detection, image recognition (e.g., face recognition, object recognition, scene recognition, etc.), feature extraction, authentication, gaze detection, gaze prediction, and/or automation. For example, neural network 1400 may be an example of, or can implement, scene detector 204 of FIG. 2 and/or FIG. 8, shadow remover 206 of FIG. 2 and/or FIG. 8, shadow detector 614 of FIG. 6A, shadow remover 714 of FIG. 7A, light-source analyzer 802 of FIG. 8, light-source repositioner 804 of FIG. 8, shadow-position determiner 1010 of FIG. 10, object-position determiner 1016 of FIG. 10, light-source-position determiner 1020 of FIG. 10, shadow reshaper 1024 of FIG. 10, and/or light repositioner 1026 of FIG. 10.

An input layer 1402 includes input data. In one illustrative example, input layer 1402 can include data representing image 202 of FIG. 2 and/or FIG. 8, image 302 of FIG. 3, image 312 of FIG. 3, image 322 of FIG. 3, image 332 of FIG. 3, image 502 of FIG. 5, image 624 of FIG. 6A, image 724 of FIG. 7A, shadow mask 730 of FIG. 7A, image 208 of FIG. 8, shadow mask 626 of FIG. 8, image 902 of FIG. 9, image 912 of FIG. 9, image 1006 of FIG. 10, image 1008 of FIG. 10, shadow mask 1012 of FIG. 10, shadow mask 1014 of FIG. 10, image-capture information 1018 of FIG. 10, and/or light-source information 1022 of FIG. 10. Neural network 1400 includes multiple hidden layers, for example, hidden layers 1406*a*, 1406*b*, through 1406*n*. The hidden layers 1406*a*, 1406*b*, through hidden layer 1406*n* include "n" number of hidden layers, where "n" is an integer greater than or equal to one. The number of hidden layers can be made to include as many layers as needed for the given application. Neural network 1400 further includes an output layer 1404 that provides an output resulting from the processing performed by the hidden layers 1406*a*, 1406*b*, through 1406*n*. In one illustrative example, output layer 1404 can provide image 208 of FIG. 2 and/or FIG. 8, image 512 of FIG. 5, shadow mask 626 of FIG. 6A, image 726 of FIG. 7A, image 806 of FIG. 8, image 912 of FIG. 9, image 922 of FIG. 9, shadow mask 1012 of FIG. 10, shadow mask 1014 of FIG. 10, light-source information 1022 of FIG. 10 and/or image 1028 of FIG. 10.

Neural network 1400 may be, or may include, a multilayer neural network of interconnected nodes. Each node can represent a piece of information. Information associated with the nodes is shared among the different layers and each layer retains information as information is processed. In some cases, neural network 1400 can include a feed-forward network, in which case there are no feedback connections where outputs of the network are fed back into itself. In some cases, neural network 1400 can include a recurrent neural network, which can have loops that allow information to be carried across nodes while reading in input.

Information can be exchanged between nodes through node-to-node interconnections between the various layers. Nodes of input layer 1402 can activate a set of nodes in the first hidden layer 1406*a*. For example, as shown, each of the input nodes of input layer 1402 is connected to each of the nodes of the first hidden layer 1406*a*. The nodes of first hidden layer 1406*a* can transform the information of each input node by applying activation functions to the input node information. The information derived from the transformation can then be passed to and can activate the nodes of the next hidden layer 1406*b*, which can perform their own designated functions. Example functions include convolutional, up-sampling, data transformation, and/or any other suitable functions. The output of the hidden layer 1406*b* can then activate nodes of the next hidden layer, and so on. The output of the last hidden layer 1406*n* can activate one or more nodes of the output layer 1404, at which an output is provided. In some cases, while nodes (e.g., node 1408) in neural network 1400 are shown as having multiple output lines, a node has a single output and all lines shown as being output from a node represent the same output value.

In some cases, each node or interconnection between nodes can have a weight that is a set of parameters derived from the training of neural network 1400. Once neural network 1400 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 1400 to be adaptive to inputs and able to learn as more and more data is processed.

Neural network 1400 may be pre-trained to process the features from the data in the input layer 1402 using the different hidden layers 1406*a*, 1406*b*, through 1406*n* in order to provide the output through the output layer 1404. In an example in which neural network 1400 is used to identify features in images, neural network 1400 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 1400 can adjust the weights of the nodes using a training process called backpropagation. As noted above, a backpropagation process can include a forward pass, a loss function, a backward pass, and a weight update. The forward pass, loss function, backward pass, and parameter update are performed for one training iteration. The process can be repeated for a certain number of iterations for each set of training images until neural network 1400 is trained well enough so that the weights of the layers are accurately tuned.

For the example of identifying objects in images, the forward pass can include passing a training image through neural network 1400. The weights are initially randomized before neural network 1400 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 1400, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 1400 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $E_{total}=\Sigma\frac{1}{2}(\text{target}-\text{output})^2$. The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 1400 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w_i-\eta dL/dW$, where w denotes a weight, $w_i$ denotes the initial weight, and $\eta$ denotes a learning rate. The learning rate can be set to any suitable value, with a high learning rate including larger weight updates and a lower value indicating smaller weight updates.

Neural network 1400 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 1400 can include any other deep network other than a CNN, such as an autoencoder, a deep belief nets (DBNs), a Recurrent Neural Networks (RNNs), among others.

Figure 15:
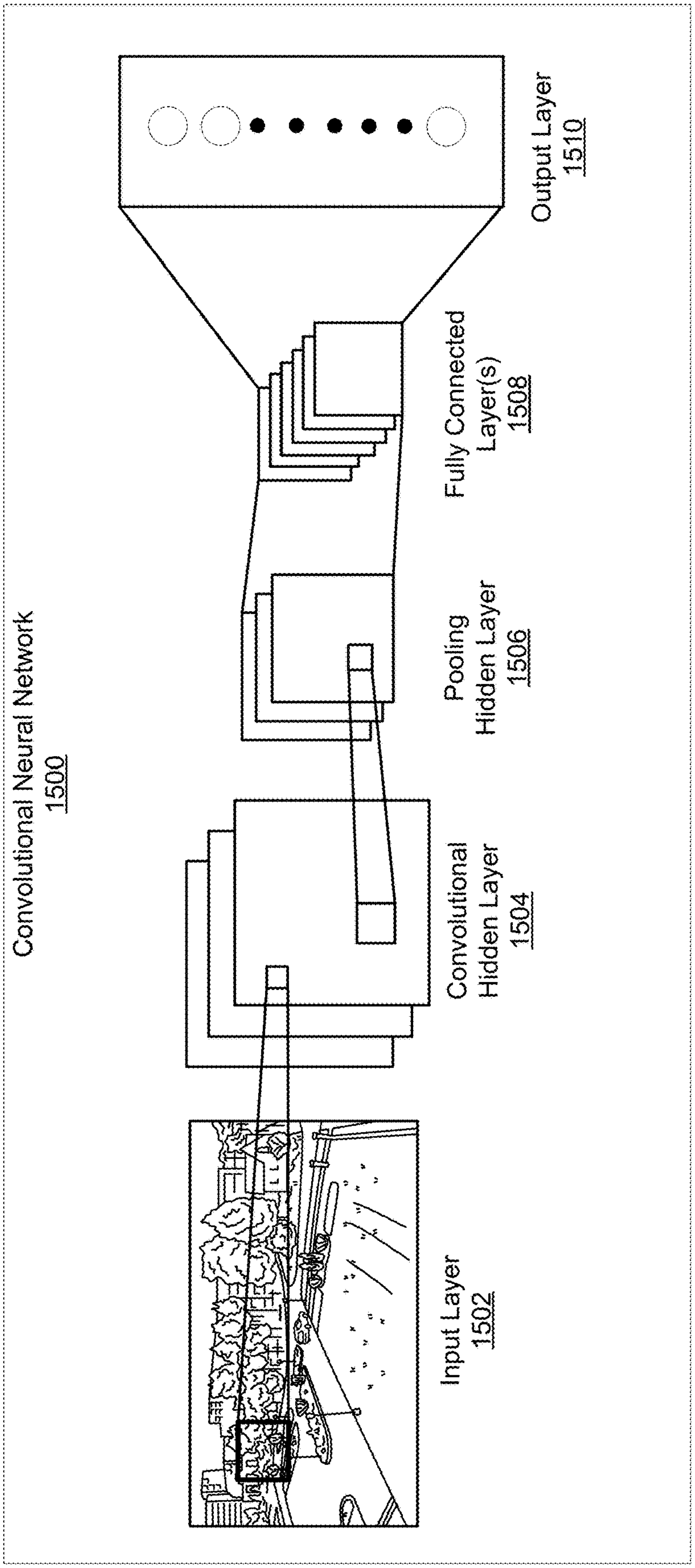
FIG. 15 is a block diagram illustrating an example of a convolutional neural network (CNN), according to various aspects of the present disclosure.

FIG. 15 is an illustrative example of a convolutional neural network (CNN) 1500. The input layer 1502 of the CNN 1500 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1504, an optional non-linear activation layer, a pooling hidden layer 1506, and fully connected layer 1508 (which fully connected layer 1508 can be hidden) to get an output at the output layer 1510. While only one of each hidden layer is shown in FIG. 15, one of ordinary skill will appreciate that multiple convolutional hidden layers, non-linear layers, pooling hidden layers, and/or fully connected layers can be included in the CNN 1500. As previously described, the output can indicate a single class of an object or can include a probability of classes that best describe the object in the image.

The first layer of the CNN 1500 can be the convolutional hidden layer 1504. The convolutional hidden layer 1504 can analyze image data of the input layer 1502. Each node of the convolutional hidden layer 1504 is connected to a region of nodes (pixels) of the input image called a receptive field. The convolutional hidden layer 1504 can be considered as one or more filters (each filter corresponding to a different activation or feature map), with each convolutional iteration of a filter being a node or neuron of the convolutional hidden layer 1504. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1504. Each connection between a node and a receptive field for that node learns a weight and, in some cases, an overall bias such that each node learns to analyze its particular local receptive field in the input image. Each node of the convolutional hidden layer 1504 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 1504 is due to each node of the convolutional layer being applied to its corresponding receptive field. For example, a filter of the convolutional hidden layer 1504 can begin in the top-left corner of the input image array and can convolve around the input image. As noted above, each convolutional iteration of the filter can be considered a node or neuron of the convolutional hidden layer 1504. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1504. For example, a filter can be moved by a step amount (referred to as a stride) to the next receptive field. The stride can be set to 1 or any other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1504.

The mapping from the input layer to the convolutional hidden layer 1504 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1504 can include several activation maps in order to identify multiple features in an image. The example shown in FIG. 15 includes three activation maps. Using three activation maps, the convolutional hidden layer 1504 can detect three different kinds of features, with each feature being detectable across the entire image.

In some examples, a non-linear hidden layer can be applied after the convolutional hidden layer 1504. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 1500 without affecting the receptive fields of the convolutional hidden layer 1504.

The pooling hidden layer 1506 can be applied after the convolutional hidden layer 1504 (and after the non-linear hidden layer when used). The pooling hidden layer 1506 is used to simplify the information in the output from the convolutional hidden layer 1504. For example, the pooling hidden layer 1506 can take each activation map output from the convolutional hidden layer 1504 and generates a condensed activation map (or feature map) using a pooling function. Max-pooling is one example of a function performed by a pooling hidden layer. Other forms of pooling functions be used by the pooling hidden layer 1506, such as average pooling, L2-norm pooling, or other suitable pooling functions. A pooling function (e.g., a max-pooling filter, an L2-norm filter, or other suitable pooling filter) is applied to each activation map included in the convolutional hidden layer 1504. In the example shown in FIG. 15, three pooling filters are used for the three activation maps in the convolutional hidden layer 1504.

In some examples, max-pooling can be used by applying a max-pooling filter (e.g., having a size of 2×2) with a stride (e.g., equal to a dimension of the filter, such as a stride of 2) to an activation map output from the convolutional hidden layer 1504. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1504 having a dimension of 24×24 nodes, the output from the pooling hidden layer 1506 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1500.

The final layer of connections in the network is a fully-connected layer that connects every node from the pooling hidden layer 1506 to every one of the output nodes in the output layer 1510. Using the example above, the input layer includes 28×28 nodes encoding the pixel intensities of the input image, the convolutional hidden layer 1504 includes 3×24×24 hidden feature nodes based on application of a 5×5 local receptive field (for the filters) to three activation maps, and the pooling hidden layer 1506 includes a layer of 3×12×12 hidden feature nodes based on application of max-pooling filter to 2×2 regions across each of the three feature maps. Extending this example, the output layer 1510 can include ten output nodes. In such an example, every node of the 3×12×12 pooling hidden layer 1506 is connected to every node of the output layer 1510.

The fully connected layer 1508 can obtain the output of the previous pooling hidden layer 1506 (which should represent the activation maps of high-level features) and determines the features that most correlate to a particular class. For example, the fully connected layer 1508 can determine the high-level features that most strongly correlate to a particular class and can include weights (nodes) for the high-level features. A product can be computed between the weights of the fully connected layer 1508 and the pooling hidden layer 1506 to obtain probabilities for the different classes. For example, if the CNN 1500 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1510 can include an M-dimensional vector (in the prior example, M=10). M indicates the number of classes that the CNN 1500 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 00.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

FIG. 16 illustrates an example computing-device architecture 1600 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1600 may include, implement, or be included in any or all of system 200 of FIG. 2, system 800 of FIG. 8, system 1000 of FIG. 10, and/or other devices, modules, or systems described herein. Additionally or alternatively, computing-device architecture 1600 may be configured to perform process 1200, process 1300, and/or other process described herein.

The components of computing-device architecture 1600 are shown in electrical communication with each other using connection 1612, such as a bus. The example computing-device architecture 1600 includes a processing unit (CPU or processor) 1602 and computing device connection 1612 that couples various computing device components including computing device memory 1610, such as read only memory (ROM) 1608 and random-access memory (RAM) 1606, to processor 1602.

Computing-device architecture 1600 can include a cache of high-speed memory connected directly with, in close proximity to, or integrated as part of processor 1602. Computing-device architecture 1600 can copy data from memory 1610 and/or the storage device 1614 to cache 1604 for quick access by processor 1602. In this way, the cache can provide a performance boost that avoids processor 1602 delays while waiting for data. These and other modules can control or be configured to control processor 1602 to perform various actions. Other computing device memory 1610 may be available for use as well. Memory 1610 can include multiple different types of memory with different performance characteristics. Processor 1602 can include any general-purpose processor and a hardware or software service, such as service 1 1616, service 2 1618, and service 3 1620 stored in storage device 1614, configured to control processor 1602 as well as a special-purpose processor where software instructions are incorporated into the processor design. Processor 1602 may be a self-contained system, containing multiple cores or processors, a bus, memory controller, cache, etc. A multi-core processor may be symmetric or asymmetric.

To enable user interaction with the computing-device architecture 1600, input device 1622 can represent any number of input mechanisms, such as a microphone for speech, a touch-sensitive screen for gesture or graphical input, keyboard, mouse, motion input, speech and so forth. Output device 1624 can also be one or more of a number of output mechanisms known to those of skill in the art, such as a display, projector, television, speaker device, etc. In some instances, multimodal computing devices can enable a user to provide multiple types of input to communicate with computing-device architecture 1600. Communication interface 1626 can generally govern and manage the user input and computing device output. There is no restriction on operating on any particular hardware arrangement and therefore the basic features here may easily be substituted for improved hardware or firmware arrangements as they are developed.

Storage device 1614 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1606, read only memory (ROM) 1608, and hybrids thereof. Storage device 1614 can include services 1616, 1618, and 1620 for controlling processor 1602. Other hardware or software modules are contemplated. Storage device 1614 can be connected to the computing device connection 1612. In one aspect, a hardware module that performs a particular function can include the software component stored in a computer-readable medium in connection with the necessary hardware components, such as processor 1602, connection 1612, output device 1624, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than (“<”) and greater than (“>”) symbols or terminology used herein can be replaced with less than or equal to (“≤”) and greater than or equal to (“≥”) symbols, respectively, without departing from the scope of this description.

Where components are described as being “configured to” perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase “coupled to” refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting “at least one of” a set and/or “one or more” of a set indicates that one member of the set or multiple members of the set (in any combination) satisfy the claim. For example, claim language reciting “at least one of A and B” or “at least one of A or B” means A, B, or A and B. In another example, claim language reciting “at least one of A, B, and C” or “at least one of A, B, or C” means A, B, C, or A and B, or A and C, or B and C, A and B and C, or any duplicate information or data (e.g., A and A, B and B, C and C, A and A and B, and so on), or any other ordering, duplication, or combination of A, B, and C. The language “at least one of” a set and/or “one or more” of a set does not limit the set to the items listed in the set. For example, claim language reciting “at least one of A and B” or “at least one of A or B” may mean A, B, or A and B, and may additionally include items not listed in the set of A and B. The phrases “at least one” and “one or more” are used interchangeably herein.

Claim language or other language reciting “at least one processor configured to,” “at least one processor being configured to,” “one or more processors configured to,” “one or more processors being configured to,” or the like indicates that one processor or multiple processors (in any combination) can perform the associated operation(s). For example, claim language reciting “at least one processor configured to: X, Y, and Z” means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting “at least one processor configured to: X, Y, and Z” can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM) electrically erasable programmable read-only memory (EEPROM) flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for modifying images, the apparatus comprising: at least one memory; and at least one processor coupled to the at least one memory and configured to: receive an image, the image including a first plurality of pixels representing a first shadow of a first shadow type and a second plurality of pixels representing a second shadow of a second shadow type; process the image to detect the first shadow; and modify the first plurality of pixels of the image to generate an output image, wherein the output image includes the second plurality of pixels representing the second shadow.

Aspect 2. The apparatus of aspect 1, wherein the first shadow type comprises shadows cast by at least one of: a hand of a person operating a handheld device to capture the image; the handheld device used to capture the image; or a head of the person.

Aspect 3. The apparatus of any one of aspects 1 or 2, wherein the image includes a third plurality of pixels representing the first shadow and the second shadow and wherein the third plurality of pixels are modified to reduce the first shadow in the third plurality of pixels.

Aspect 4. The apparatus of aspect 3, wherein the third plurality of pixels are modified to preserve the second shadow.

Aspect 5. The apparatus of any one of aspects 1 to 4, wherein the first shadow is detected based on a user input.

Aspect 6. The apparatus of any one of aspects 1 to 5, wherein the at least one processor is configured to determine that an image is a candidate for shadow removal based on image-capture conditions related to the image;

Aspect 7. The apparatus of aspect 6, wherein the image-capture conditions comprise at least one of: a focus setting used to capture the image; an exposure setting used to capture the image; a tilt angle of a device used to capture the image; a subject of the image being stationary; or a classification of the image by an image classifier.

Aspect 8. The apparatus of any one of aspects 6 or 7, wherein the image is determined to be a candidate for shadow removal using a machine-learning model trained to identify candidate images for shadow removal based on at least one of: a focus setting used to capture of the image; an exposure setting used to capture the image; a tilt angle of a device used to capture the image; or a subject of the image being stationary.

Aspect 9. The apparatus of any one of aspects 6 to 8, wherein the image is determined to be a candidate for shadow removal by a machine-learning model trained to identify shadows of the first shadow type in images.

Aspect 10. The apparatus of any one of aspects 1 to 9, wherein the first plurality of pixels of the image are determined using a machine-learning model trained to identify shadows of the first shadow type in images.

Aspect 11. The apparatus of any one of aspects 1 to 10, wherein the first plurality of pixels of the image are modified using a machine-learning model trained to remove shadows of the first shadow type from images.

Aspect 12. The apparatus of any one of aspects 1 to 11, wherein the at least one processor is configured to: analyze a light source that resulted in the first shadow; and modify, based on analyzing the light source, the image to simulate a change to the light source.

Aspect 13. The apparatus of aspect 12, wherein the image comprises a first image captured by a device at a first position, wherein the light source is analyzed based on: a second image captured by the device at a second position; and a third plurality of pixels that represent the first shadow in the second image.

Aspect 14. The apparatus of any one of aspects 12 or 13, wherein the image is modified using a tone-mapping algorithm.

Aspect 15. The apparatus of any one of aspects 12 to 14, wherein the image is modified to simulate a change to at least one of: a position of the light source; an intensity of the light source; or a hue of the light source.

Aspect 16. A method for modifying images, the method comprising: receiving an image, the image including a first plurality of pixels representing a first shadow of a first shadow type and a second plurality of pixels representing a second shadow of a second shadow type; processing the image to detect the first shadow; and modifying the first plurality of pixels of the image to generate an output image, wherein the output image includes the second plurality of pixels representing the second shadow.

Aspect 17. The method of aspect 16, wherein the first shadow type comprises shadows cast by at least one of: a hand of a person operating a handheld device to capture the image; the handheld device used to capture the image; or a head of the person.

Aspect 18. The method of any one of aspects 16 or 17, wherein the image includes a third plurality of pixels representing the first shadow and the second shadow and wherein the third plurality of pixels are modified to reduce the first shadow in the third plurality of pixels.

Aspect 19. The method of aspect 18, wherein the third plurality of pixels are modified to preserve the second shadow.

Aspect 20. The method of any one of aspects 16 to 19, wherein the first shadow is detected based on a user input.

Aspect 21. The method of any one of aspects 16 to 20, further comprising determining that an image is a candidate for shadow removal based on image-capture conditions related to the image;

Aspect 22. The method of aspect 21, wherein the image-capture conditions comprise at least one of: a focus setting used to capture the image; an exposure setting used to capture the image; a tilt angle of a device used to capture the image; a subject of the image being stationary; or a classification of the image by an image classifier.

Aspect 23. The method of any one of aspects 21 or 22, wherein the image is determined to be a candidate for shadow removal using a machine-learning model trained to identify candidate images for shadow removal based on at least one of: a focus setting used to capture of the image; an exposure setting used to capture the image; a tilt angle of a device used to capture the image; or a subject of the image being stationary.

Aspect 24. The method of any one of aspects 21 to 23, wherein the image is determined to be a candidate for shadow removal by a machine-learning model trained to identify shadows of the first shadow type in images.

Aspect 25. The method of any one of aspects 16 to 24, wherein the first plurality of pixels of the image are determined using a machine-learning model trained to identify shadows of the first shadow type in images.

Aspect 26. The method of any one of aspects 16 to 25, wherein the first plurality of pixels of the image are modified using a machine-learning model trained to remove shadows of the first shadow type from images.

Aspect 27. The method of any one of aspects 16 to 26, further comprising: analyzing a light source that resulted in the first shadow; and modifying, based on analyzing the light source, the image to simulate a change to the light source.

Aspect 28. The method of aspect 27, wherein the image comprises a first image captured by a device at a first position, wherein the light source is analyzed based on: a second image captured by the device at a second position; and a third plurality of pixels that represent the first shadow in the second image.

Aspect 29. The method of any one of aspects 27 or 28, wherein the image is modified using a tone-mapping algorithm.

Aspect 30. The method of any one of aspects 27 to 29, wherein the image is modified to simulate a change to at least one of: a position of the light source; an intensity of the light source; or a hue of the light source.

Aspect 31. A method for modifying images, the method comprising: determining that an image is a candidate for shadow removal based on image-capture conditions related to the image; responsive to determining that the image is a candidate for shadow removal, determining a first plurality of pixels of the image that represent a first shadow, the first shadow being of a first shadow type; and modifying the first plurality of pixels of the image to generate an output image, wherein the output image includes a second plurality of pixels that represent a second shadow, the second shadow being of a second shadow type.

Aspect 32. The method of aspect 31, wherein first shadow type comprises shadows cast by at least one of: a hand of a person operating a handheld device to capture the image; the handheld device used to capture the image; or a head of the person.

Aspect 33. The method of any one of aspects 31 or 32, wherein the image-capture conditions comprise at least one of: a focus setting used to capture image; a tilt angle of a device used to capture the image; a subject of the image being stationary; or a classification of the image by an image classifier.

Aspect 34. The method of any one of aspects 31 to 33, wherein the image is determined to be a candidate for shadow removal using a machine-learning model trained to identify candidate images for shadow removal based on at least one of: a focus setting used to capture of the image; a tilt angle of a device used to capture the image; or a subject of the image being stationary.

Aspect 35. The method of any one of aspects 31 to 34, wherein the image is determined to be a candidate for shadow removal by a machine-learning model trained to identify shadows of the first shadow type in images.

Aspect 36. The method of any one of aspects 31 to 35, wherein the first plurality of pixels of the image are determined using a machine-learning model trained to identify shadows of the first shadow type in images.

Aspect 37. The method of any one of aspects 31 to 36, wherein the first plurality of pixels of the image are modified using a machine-learning model trained to remove shadows of the first shadow type from images.

Aspect 38. The method of any one of aspects 31 to 37, further comprising: analyzing a light source that resulted in the first shadow; and modifying, based on analyzing the light source, the image to simulate a change to the light source.

Aspect 39. The method of aspect 38, wherein the image comprises a first image captured by a device at a first position, wherein the light source is analyzed based on: a second image captured by the device at a second position; and a third plurality of pixels that represent the first shadow in the second image.

Aspect 40. The method of any one of aspects 38 or 39, wherein the image is modified using a tone mapping algorithm.

Aspect 41. The method of any one of aspects 38 to 40, wherein the image is modified to simulate a change to at least one of: a position of the light source; an intensity of the light source; or a hue of the light source.

Aspect 42. A non-transitory computer-readable storage medium having stored thereon instructions that, when executed by at least one processor, cause the at least one processor to perform operations according to any of aspects 16 to 41.

Aspect 43. An apparatus for providing virtual content for display, the apparatus comprising one or more means for perform operations according to any of aspects 16 to 41.

What is claimed is:

1. An apparatus for modifying images, the apparatus comprising:
- at least one memory; and
- at least one processor coupled to the at least one memory and configured to:
  - receive an image, the image including a first plurality of pixels representing a first shadow of a first shadow type, a second plurality of pixels representing a second shadow of a second shadow type, and a third plurality of pixels representing the first shadow and the second shadow, wherein the first shadow type is cast by a first type of object, wherein the second shadow type is cast by a second type of object, and wherein the first type of object is different than the second type of object;
  - process the image to detect the first shadow; and
  - modify the first plurality of pixels and the third plurality of pixels of the image to generate an output image, wherein the output image includes the second plurality of pixels representing the second shadow and wherein the third plurality of pixels are modified in the output image to reduce the first shadow in the third plurality of pixels.

2. The apparatus of claim 1, wherein the first type of object comprises at least one of:
- a hand of a person operating a handheld device to capture the image;
- the handheld device used to capture the image; or
- a head of the person.

3. The apparatus of claim 1, wherein the third plurality of pixels are modified to preserve the second shadow.

4. The apparatus of claim 1, wherein the first shadow is detected based on a user input.

5. The apparatus of claim 1, wherein the at least one processor is configured to determine that an image is a candidate for shadow removal based on image-capture conditions related to the image.

6. The apparatus of claim 5, wherein the image-capture conditions comprise at least one of:
- a focus setting used to capture the image;
- an exposure setting used to capture the image;
- a tilt angle of a device used to capture the image;
- a subject of the image being stationary; or
- a classification of the image by an image classifier.

7. The apparatus of claim 5, wherein the image is determined to be a candidate for shadow removal using a machine-learning model trained to identify candidate images for shadow removal based on at least one of:
- a focus setting used to capture of the image;
- an exposure setting used to capture the image;
- a tilt angle of a device used to capture the image; or
- a subject of the image being stationary.

8. The apparatus of claim 5, wherein the image is determined to be a candidate for shadow removal by a machine-learning model trained to identify shadows of the first shadow type in images.

9. The apparatus of claim 1, wherein the first plurality of pixels of the image are determined using a machine-learning model trained to identify shadows of the first shadow type in images.

10. The apparatus of claim 1, wherein the first plurality of pixels of the image are modified using a machine-learning model trained to remove shadows of the first shadow type from images.

11. The apparatus of claim 1, wherein the at least one processor is configured to:
- analyze a light source that resulted in the first shadow; and
- modify, based on analyzing the light source, the image to simulate a change to the light source.

12. The apparatus of claim 11, wherein the image comprises a first image captured by a device at a first position, wherein the light source is analyzed based on:
- a second image captured by the device at a second position; and
- a third plurality of pixels that represent the first shadow in the second image.

13. The apparatus of claim 11, wherein the image is modified using a tone-mapping algorithm.

14. The apparatus of claim 11, wherein the image is modified to simulate a change to at least one of:
- a position of the light source;
- an intensity of the light source; or
- a hue of the light source.

15. A method for modifying images, the method comprising:
- receiving an image, the image including a first plurality of pixels representing a first shadow of a first shadow type, a second plurality of pixels representing a second shadow of a second shadow type, and a third plurality of pixels representing the first shadow and the second shadow, wherein the first shadow type is cast by a first type of object, wherein the second shadow type is cast by a second type of object, and wherein the first type of object is different than the second type of object;
- processing the image to detect the first shadow; and modifying the first plurality of pixels and the third plurality of pixels of the image to generate an output image, wherein the output image includes the second plurality of pixels representing the second shadow and wherein the third plurality of pixels are modified in the output image to reduce the first shadow in the third plurality of pixels.

16. The method of claim 15, wherein the first type of object comprises at least one of:

a hand of a person operating a handheld device to capture the image;

the handheld device used to capture the image; or a head of the person.

17. The method of claim 15, wherein the third plurality of pixels are modified to preserve the second shadow.

18. The method of claim 15, wherein the first shadow is detected based on a user input.

* * * * *